(12) United States Patent
Lindner et al.

(10) Patent No.: US 12,711,411 B2
(45) Date of Patent: Aug. 18, 2026

(54) OPTICAL CIRCUITS FOR PURIFICATION OF SINGLE PHOTON STATES

(71) Applicant: California Institute of Technology, Pasadena, CA (US)

(72) Inventors: Netanel H. Lindner, Aviel (IL); Soonwon Choi, El Cerrito, CA (US); John P. Preskill, Pasadena, CA (US)

(73) Assignees: CALIFORNIA INSTITUTE OF TECHNOLOGY, Pasadena, CA (US); TECHNION RESEARCH & DEVELOPMENT FOUNDATION LIMITED, Haifa (IL)

( * ) Notice: Subject to any disclaimer, the term of this patent is extended or adjusted under 35 U.S.C. 154(b) by 832 days.

(21) Appl. No.: 18/077,863

(22) Filed: Dec. 8, 2022

(65) Prior Publication Data

US 2023/0206106 A1 Jun. 29, 2023

Related U.S. Application Data

(60) Provisional application No. 63/287,295, filed on Dec. 8, 2021.

(51) Int. Cl.
*G06N 10/40* (2022.01)

(52) U.S. Cl.
CPC .................................... *G06N 10/40* (2022.01)

(58) Field of Classification Search
CPC ..................................................... G06N 10/40
USPC ......................................................... 716/136
See application file for complete search history.

(56) References Cited

U.S. PATENT DOCUMENTS

2023/0133597 A1* 5/2023 Wallner .................. G06F 17/11 708/490

OTHER PUBLICATIONS

Knill, E., et al., "A scheme for efficient quantum computation with linear optics", Nature, Jan. 2001, pp. 46-52, vol. 409.

(Continued)

*Primary Examiner* — Eric D Lee
(74) *Attorney, Agent, or Firm* — GATES & COOPER LLP

(57) ABSTRACT

The present disclosure describes an interferometer interfering a plurality of bosonic particles at one or more inputs so as to form one or more first outputs, one or more second outputs, and one or more third outputs. The one or more third outputs output one or more purified bosonic particles depending on the presence of absence of bosonic particles at the first outputs and second outputs.

22 Claims, 11 Drawing Sheets

(56) References Cited

OTHER PUBLICATIONS

Rohde, P.R., et al., "Frequency and temporal effects in linear optical quantum computing", Physical Review A, 2005, pp. 032320-1-032320-10, vol. 71.

Santori, C., et al., "Indistinguishable photons from a single-photon device", Nature, Oct. 2002, pp. 594-597, vol. 419.

Legero, T., et al., "Quantum Beat of Two Single Photons", Physical Review Letters, Aug. 2004, pp. 070503-1-070503-4, vol. 93, No. 7.

Rohde, P.R., et al., "Spectral structure and decompositions of optical states, and their applications", New Journal of Physics, 2007, pp. 1-23, vol. 9, No. 91.

Kok, P., et al., "Linear optical quantum computing with photonic qubits", Reviews of Modern Physics, Jan.-Mar. 2007, pp. 135-174, vol. 79.

Rohde, P.R., et al., "Optimal photons for quantum-information processing", Physical Review A, 2005, pp. 052332-1-052332-6, vol. 72.

Aaronson, S., et al., "The Computational Complexity of Linear Optics", Proceedings of the 43rd Annual ACM Symposium on Theory of Computing, STOC '11, 2011, pp. 333-342.

* cited by examiner

OPTICAL CIRCUITS FOR PURIFICATION OF SINGLE PHOTON STATES

CROSS REFERENCE TO RELATED APPLICATIONS

This application claims the benefit under 35 U.S.C. Section 119(e) of the following commonly-assigned application:

U.S. Provisional Application Ser. No. 63/287,295, filed on Dec. 8, 2021, by Netanel H. Lindner, Soonwon Choi, and John P. Preskill, entitled "OPTICAL CIRCUITS FOR PURIFICATION OF SINGLE PHOTON STATES,"; which application is incorporated by reference herein.

STATEMENT REGARDING FEDERALLY SPONSORED RESEARCH AND DEVELOPMENT

This invention was made with government support under Grant No. PHY0803371 awarded by the National Science Foundation. The government has certain rights in the invention.

BACKGROUND OF THE INVENTION

1. Field of the Invention

The present disclosure relates to systems and methods for outputting bosonic particles (bosons) in a purified quantum state.

2. Description of the Related Art (Note: This application references a number of different references as indicated throughout the specification by one or more reference numbers within brackets, e.g., [x]. A list of these different references ordered according to these reference numbers can be found below in the section entitled "References." Each of these publications is incorporated by reference herein.)

The prospect of building quantum computers holds great promise for performing computations that are not possible on classical computers (including all platforms for computing available today and supercomputers). The new computational power which will be made available with quantum computers could enable development of new breakthroughs in science and technology such as design of new materials to make more efficient devices and structures, drug development, novel machine learning methods, financial strategies, and algorithms for efficient direction of resources, among many others.

Since their inception in 1980's, quantum computers have turned out to be extremely hard to build, due to the delicate properties of quantum mechanics which get washed away when the system is in contact with an external environment. To date, a fully operational quantum computer is not available, despite immense efforts in both the academic and the industrial world. One of the most promising directions for building quantum computers relies on the availability of sources of single photons. The single photons generated by these sources are then inserted into an optical circuit, and together with high-precision single photon detectors serve as the physical platform for performing quantum computing. The great advantage in using photonic platforms for quantum computing is the fact that photons interact very weakly with their environment, thus solving the main challenge of noise and decoherence currently prohibiting further progress in the development of quantum computers. However, if the state of the photons produced by the source is not pure, the photons cannot undergo perfect interference and a photonic quantum computer using the photons will become noisy and ineffective. Moreover, all known sources which produce single photons at a sufficiently high rate, also produce photons whose quantum state is not sufficiently "pure" for quantum computing applications. The present invention satisfies this need.

SUMMARY OF THE INVENTION

The present disclosure describes an interferometer interfering a plurality of bosonic particles at one or more inputs so as to form one or more first outputs, one or more second outputs, and one or more third outputs. The one or more third outputs output one or more purified bosonic particles depending on the presence of absence of bosonic particles at the first outputs and second outputs. As used herein, a purified bosonic particle is defined as a bosonic particle in a purified quantum state.

Methods, systems, and devices according to the present invention can be embodied in many ways including, but not limited to, the following.

1. A device, comprising:

an interferometer:

interfering a plurality of bosonic particles at one or more inputs so as to form a plurality of outputs comprising one or more first outputs, one or more second outputs, and one or more third outputs; and one or more detectors:

detecting an absence or presence of a bosonic particle at each of the one or more first outputs and the one or more second outputs; and wherein one or more purified bosonic particles are selected at the one or more third outputs if a predetermined number of the bosonic particles are detected at each of the one or more first outputs and the one or more second outputs.

2. The device of example 1, wherein the predetermined number can be different at each of the first outputs and at each of the second outputs.

3. The device of example 1, wherein the plurality of bosonic particles are in a plurality of different bosonic modes.

4. The device of example 1, wherein:

the plurality of bosonic particles consist of two bosonic particles including a first bosonic particle in a first input mode and a second bosonic particle in a second input mode, the interferometer interferes the plurality of bosonic particles with one vacuum mode, comprising an absence of a bosonic particle, in a third input mode, and the first outputs comprise one first output, the second outputs comprise one second output, the predetermined number of bosonic particles in the one first output is zero, and the predetermined number of bosonic particles in the one second output is one.

5. The device of example 4, wherein:

the interferometer further comprises a first coupling and a second coupling, the first bosonic particle interferes with the second bosonic particle in the first coupling, and an intermediate output of the first coupling interferes with the one vacuum mode in the second coupling.

6. The device of example 5, wherein:

the inputs consist of one first input inputting from a first path to the first coupling, one second input inputting from a second path to the first coupling, and one third input inputting to a third path;

the one or more third outputs comprise one third output;

the first coupling coupling between the first path and the second path:

interferes the first bosonic particle transmitted in the first path with the second bosonic particle transmitted in the second path, so to form an interference, and outputs to the one first output and an intermediate output connected to a fourth path;

the second coupling coupling between the third path and the fourth path:

interferes the intermediate output transmitted in the fourth path with the one vacuum mode transmitted in the third path, and outputs to the one second output and the one third output;

the one third output outputs the one purified bosonic particle in response to the one vacuum mode (the absence of a bosonic particle) being detected at the one first output and the one bosonic particle being detected at the one second output, and the purified bosonic particle has a higher purity than the first bosonic particle and the second bosonic particle.

7. The device of any of the examples 4-6, further comprising the one or more detectors detecting the one output vacuum mode at the first output in a first output mode and one bosonic particle at the one second output, and wherein the one third output transmits the one purified bosonic particle.

8. The device of any of the examples 1-7, wherein each of the plurality of bosonic particles have input modes comprising at least one of:

one or more spatial modes, or one or more modes different from a spatial mode (e.g., a polarization mode, a temporal mode).

9. The device of example 1, further comprising:

the interferometer comprising a plurality of first couplings and a plurality of second couplings, wherein the plurality of bosonic particles interfere in the first couplings and an intermediate output of the first couplings interferes in the second couplings with one or more vacuum modes.

10. The device of example 9, wherein:

the interferometer includes a first plurality of paths and a second plurality of paths;

the inputs comprise first inputs and second inputs inputting from the first plurality of paths to the first couplings and third inputs and fourth inputs inputting from the second plurality of paths to the second couplings;

the outputs comprise the first outputs, the second outputs, and the one or more third outputs;

the first couplings:

couple the first plurality of paths so as to interfere the plurality of bosonic particles transmitted in the first plurality of paths; and have the first outputs and the intermediate output;

the second couplings:

interfere one or more bosonic particles from the intermediate output of the first couplings with a vacuum mode inputted to one of the fourth inputs to form a second intermediate output;

couple the second plurality of paths so as to interfere the vacuum modes, inputted to the second plurality of paths from the fourth inputs, with each other and with the first intermediate output;

output to the second outputs and the one or more third outputs;

the one or more third outputs output the one or more purified bosonic particles when:

the predetermined number of bosonic particles being detected at each of the first outputs is zero;

the predetermined number of bosonic particles being detected at each of the second outputs is one; and the one or more purified bosonic particles each have a higher purity than any of the plurality of bosonic particles inputted to the inputs.

11. The device of example 1, wherein the interferometer further comprises a first set of n couplings and a second set of m couplings interfering the bosonic particles and the vacuum modes, wherein:

$n \geq 2$ is the number of the first set of couplings, $m \geq 2$ is the number of the second set of couplings, and $N > 2$ is the number of the bosonic particles inputted to the first set of couplings.

12. The device of example 11, wherein $m=n=N-1$.

13. The device of example 11 or 12, wherein:

each of the first set of n couplings have the inputs comprising a first input and a second input and first coupling outputs comprising one of the first outputs and a first intermediate output, the first intermediate output of the $j^{th}$ coupling in the first set of n couplings is coupled to the first input of the $j+1^{th}$ coupling for $1 \leq j < n$;

each of the second set of m couplings have the inputs comprising a third input and a fourth input and two second coupling outputs selected from a second intermediate output, one or more of the second outputs, and one of the third outputs, the $k^{th}$ coupling in the second set of m couplings has the second coupling outputs comprising one of the second outputs and the second intermediate output, for $1<k<m$, the $k=m^{th}$ coupling in the second set of m couplings has the second coupling outputs comprising two of the second outputs, the $k=1^{th}$ coupling in the second set of m couplings has the second coupling outputs comprising the third output and the second intermediate output, the second intermediate output of the $k^{th}$ coupling in the second set of m couplings is coupled to the third input of the $k+1^{th}$ coupling in the second set of couplings for $1 \leq k < m$, the third input of the first ($k=1^{th}$) coupling in the second set of m couplings is coupled to the first intermediate output of the last ($n^{th}$) coupling in the first set of n couplings, each of the plurality of vacuum modes are coupled to a different one of the fourth inputs to the second set of m couplings, and the third output of the first ($k=1^{th}$) coupling in the second set of m couplings outputs one of the purified bosonic particles in response to:

the plurality N of bosonic particles being inputted to the first set of n couplings so that one of the plurality of bosonic particles is inputted to each second input of the first set of n couplings and the first input of the $(j=1)^{th}$ coupling, the predetermined number of bosonic particles being detected at each of the first outputs is zero, and the predetermined number of bosonic particles being detected at each of the second outputs of the k>1 couplings in the second set of m couplings is one.

14. The device of any of the preceding examples 1-13, comprising a shutter, gate, or processor selecting and/or transmitting the one or more purified bosonic particles for use in an application.

13. The device of any of the preceding examples 1-14, wherein the bosonic particles comprise photons and the interferometer interferes an electromagnetic field of the photons or vacuum mode(s) received in the inputs.

14. The device example 13, wherein the detectors comprise one or more photodetectors detecting the one or more bosonic particles comprising photons and/or certifying the absence of bosonic particles comprising photons.

15. The device of any of the preceding examples 5-7 or 9-13, wherein the couplings each comprise a beamsplitter, a coupler, or a linear optical device capable of interfering photons or electromagnetic fields.

16. The device of any of the preceding examples 1-15, wherein a purity of the purified bosonic particles is increased by at least 1% as compared to an input purity of one or more of the plurality of bosonic particles inputted at the inputs.

17. The device of any of the preceding examples 1-16, wherein the purity of the purified bosonic particles is such that purified bosonic particles outputted at the one or more third outputs are more indistinguishable from each other and the plurality of bosonic particles are more distinguishable than the purified bosonic particles.

18. The device of any of the preceding examples 1-17, wherein the purity of the purified bosonic particles is characterized by observation of a dip evidencing a Hong-Ou-Mandel effect in a two-photon interference measurement between the purified bosonic particles outputted from the device, wherein the dip is larger and has higher contrast as compared to a dip, if any, measured for the two-photon interference between any two of the plurality of bosonic particles.

19. The device of any of the preceding examples 1-18, wherein the purity of the purified bosonic particles is sufficient for the purified bosonic particles to be used in quantum computing, quantum memory, quantum communication, quantum cryptography, or quantum sensing.

20. The device of any of the examples 1-19, wherein the purified bosonic particles have the purity sufficient for use as a qubit in any quantum application.

21. A photonic integrated circuit including the device of any of the preceding examples 1-20.

22. The circuit of examples 21 and 6 or 10 wherein the paths comprise waveguides in the photonic integrated circuit.

23. The device of any of the preceding examples 1-22, further comprising a source of the bosonic particles inputted into the interferometer.

24. The device of any of the preceding examples 1-14, 16-20, or 23, wherein the bosonic particles comprise phonons.

25. A method of making a purified bosonic particle, comprising:

interfering a plurality of bosonic particles at one or more inputs so as to form a plurality of outputs comprising one or more first outputs, one or more second outputs, and one or more third outputs;

detecting an absence or presence of a bosonic particle at each of the one or more first outputs and the one or more second outputs; and selecting one or more purified bosonic particles at the one or more third outputs if a predetermined number of the bosonic particles are detected at each of the one or more first outputs and the one or more second outputs.

26. The method of example 25 using the device of any of the examples 2-24.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The present disclosure describes a device and method for producing high purity bosonic particles. The device comprises an interferometer interfering a plurality of bosonic particles at one or more inputs so as to form a plurality of outputs comprising one or more first outputs, one or more second outputs, and one or more third outputs. The device further comprises one or more detectors detecting an absence or presence of a bosonic particle at each of the one or more first outputs and the one or more second outputs. One or more purified bosonic particles are selected at the one or more third outputs if a predetermined number of the bosonic particles are detected at each of the one or more first outputs and the one or more second outputs. In one or more examples, the predetermined number is different at each of the first outputs.

The system can be embodied in many ways. Example interferometers are further described in the following sections.

First Example

Figure 1:
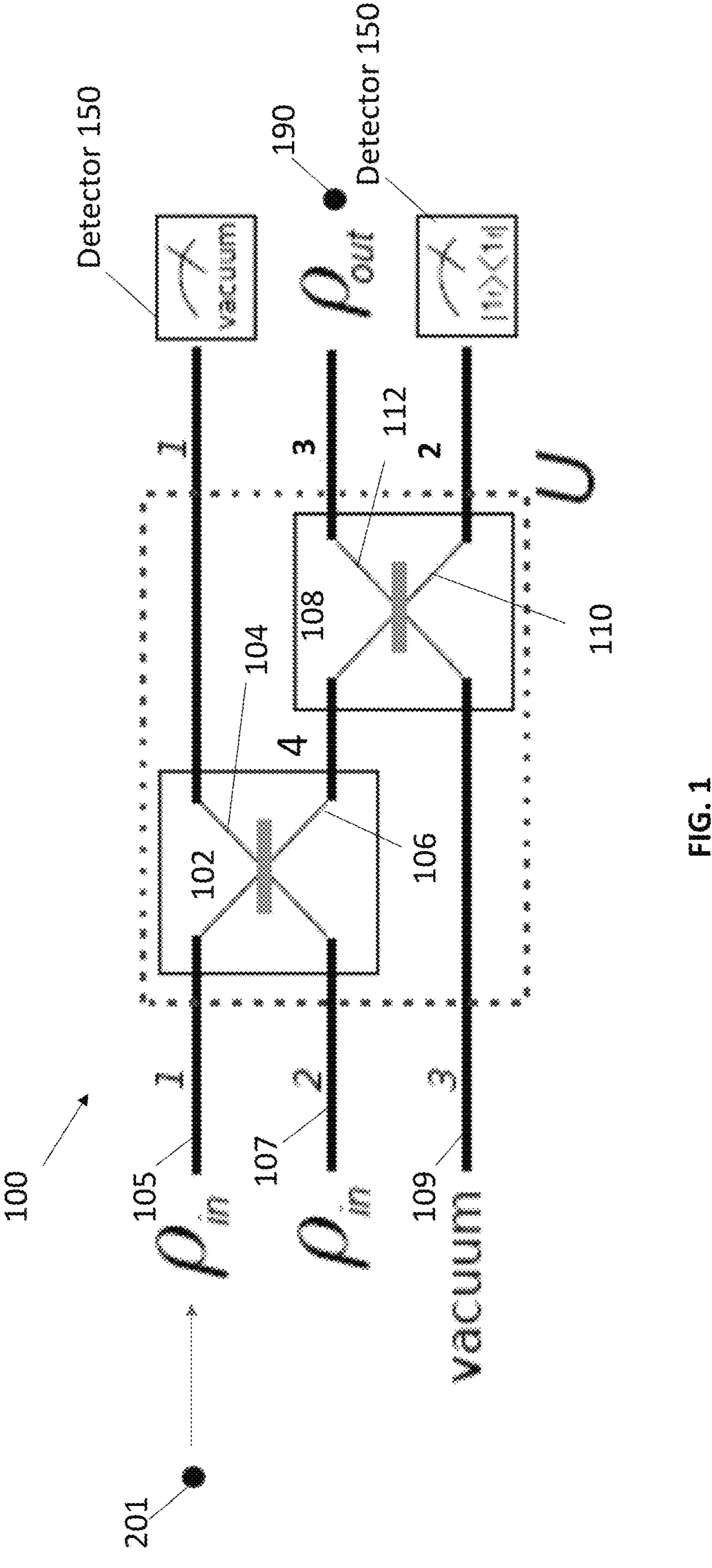
FIG. 1 illustrates an interferometer according to a first example.

FIG. 1 illustrates an interferometer 100 including a first path 1, a second path 2, and a first coupling 102 between the first path and the second path. The first coupling interferes a first bosonic particle in quantum state in in a first input mode transmitted in the first path, with a second bosonic particle in quantum state in in a second input mode transmitted in the second path. The first coupling outputs a first interference of the first bosonic particle and the second bosonic particle to a first output 104 and/or an intermediate output 106. The first bosonic particle is inputted to the first path through a first input 105 and the second bosonic particle is inputted to the second path through a second input 107.

The device further comprises a third path 3 and a fourth path 4 connected to the intermediate output 106; and a second coupling 108 between the third path the fourth path. The second coupling interferes the first interference from the intermediate output 106 transmitted in the fourth path with one vacuum mode in a third input mode transmitted in the third path. The second coupling outputs a second interference (of the vacuum mode and the first interference) to a second output 110 and a third output 112. The vacuum mode is inputted to the third path through a third input 109.

The third output 112 outputs a purified bosonic particle 190 in quantum state pout in response one output vacuum mode (equivalent to an absence of a bosonic particle) being detected at the first output 104 using a detector 150 and one output bosonic particle being detected at the second output 110 using a detector 150. Thus, in this case, the first outputs comprise one first output, the second outputs comprise one second output, the predetermined number of bosonic particles in the one first output is zero, and the predetermined number of bosonic particles in the one second output is one. The purified bosonic particle has a higher purity than the first bosonic particle and the second bosonic particle.

Second Example

The number of inputs and coupling stages can be optimized to increase the purity of the purified bosonic particles as well as the efficiency (probability of success) of increasing the purity.

Figure 2:
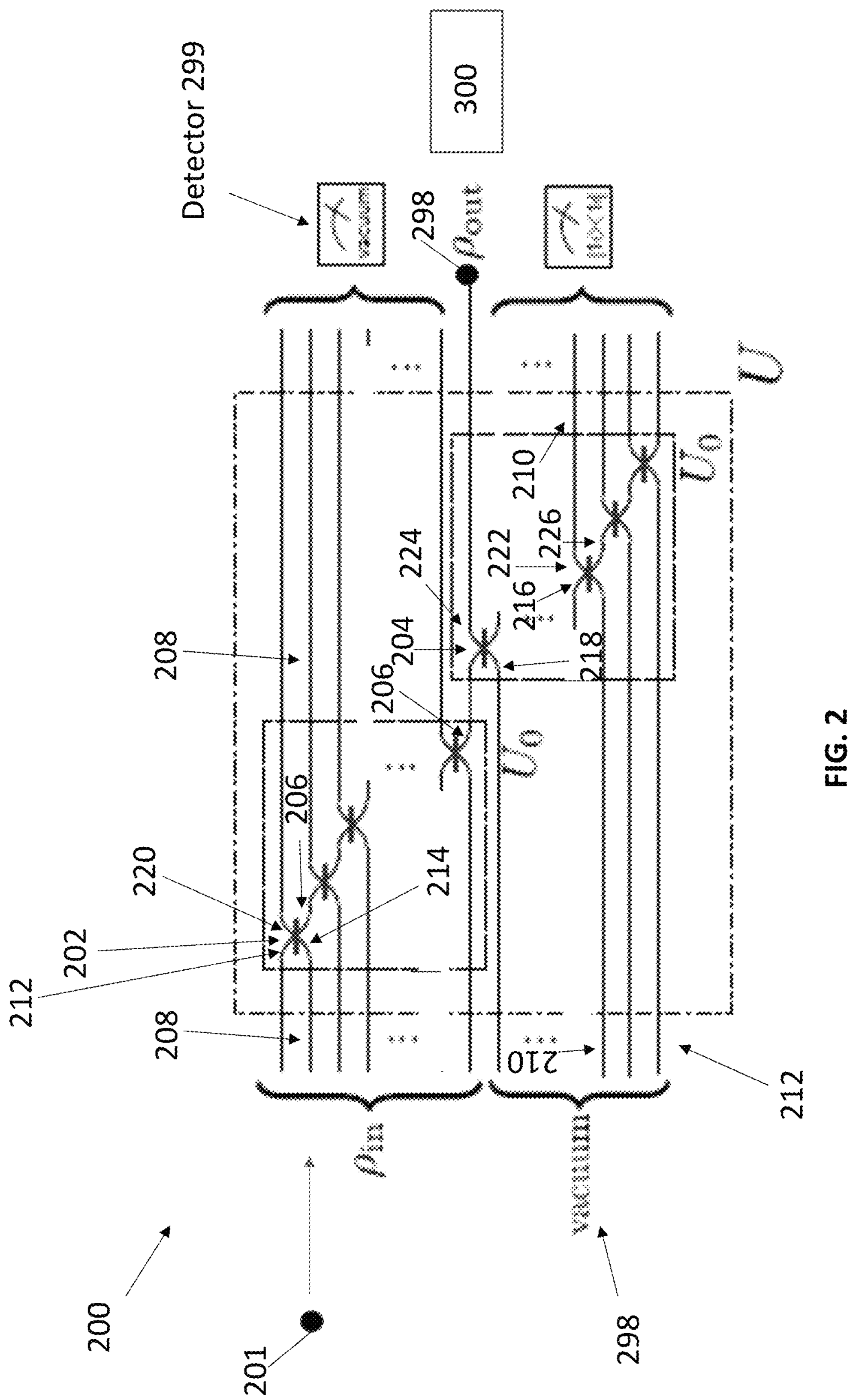
FIG. 2 illustrates an interferometer according to a second example.

FIG. 2 illustrates the interferometer 200 to include a plurality of first couplings (one example is 202) and a plurality of second couplings (one example is 204), wherein the plurality of bosonic particles interfere in the first couplings and an intermediate output 206 of the first couplings 202 interferes with one of the vacuum modes in the second couplings 204.

FIG. 2 illustrates the interferometer further includes a first plurality of paths (one example is 208) and a second plurality of paths (one example is 210). The inputs comprise first inputs (one example is 212) and second inputs (one example is 214) inputting from the first plurality of paths and into the first couplings 202, and third inputs (one example is 216) and fourth inputs (one example is 218) inputting from the second plurality of paths and into the second couplings. The outputs of the interferometer comprise first outputs (one example is 220), second outputs (one example is 222), and one or more third outputs (one example is 224).

The first couplings (one example is 202) couple the first plurality of paths so as to interfere the plurality of bosonic particles transmitted in the first plurality of paths. The first couplings each have one of the first outputs 220 and one of the first intermediate outputs 206.

The second couplings each have at least two second coupling outputs selected from a second intermediate output (one example is 226), one or more of the second outputs (one example is 222), and one of the third outputs (one example is 224). The second couplings:

(1) interfere a first interference output from the intermediate output 206 of the last of the first couplings with a vacuum mode inputted to one of the fourth inputs 218.

(2) couple the second plurality of paths so as to interfere the vacuum modes inputted to the second plurality of paths from the fourth inputs 218. This is achieved by connecting the third inputs 216 of each of the second couplings (except the first one of the second couplings) to the second intermediate output 226 of a previous one of the second couplings. In this way, the vacuum modes are interfered with each other and with the first interference output from the last of the first intermediate outputs 206.

(3) output to the second outputs 222 and the one or more third outputs 224.

The one or more third outputs output the purified bosonic particle in response to the output vacuum modes (an absence of bosonic particles) being detected at each of the first outputs 220; and one of the output bosonic particles being detected at each of the second outputs 222.

As in the first example, the one or more purified bosonic particles 298 outputted at the third outputs have a higher purity than any of the plurality of bosonic particles inputted to the interferometer.

In general, the interferometer can have a first set of n couplings 202 and a second set of m couplings 204 interfering the bosonic particles and the vacuum modes, wherein $n \geq 2$ is the number of the first set of couplings, $m \geq 2$ is the number of the second set of couplings, and $N > 2$ is the number of the bosonic particles inputted to the first set of couplings. In one or more examples, $m = n = N-1$.

Using n, m, and N, FIG. 2 illustrates:

the first intermediate output 206 of the $j^{th}$ coupling in the first set of n couplings is coupled to the first input of the $j+1^{th}$ coupling for $1 \leq j < n$;

each of the second set of m couplings 204 have the inputs comprising a third input 216 and a fourth input 218 and at least two second coupling outputs selected from a second intermediate output 226, one or more of the second outputs 222, and the third output 224;

the $k^{th}$ coupling in the second set of m couplings has the second coupling outputs comprising one of the second outputs 222 and the second intermediate output 226, for $1 < k < m$;

the $k=m^{th}$ coupling in the second set of m couplings has the second coupling outputs comprising two of the second outputs 222;

the $k=1^{th}$ coupling in the second set of m couplings has the second coupling outputs comprising the third output 224 and the second intermediate output 226;

the second intermediate output 226 of the $k^{th}$ coupling in the second set of m couplings 204 is coupled to the third input 216 of the $k+1^{th}$ coupling for $1 \leq k < m$;

the third input 216 of the first (k=1$^{th}$) coupling in the second set of m couplings is coupled to the first intermediate output 206 of the last (n$^{th}$) coupling in the first set of n couplings 202;

each of the plurality of vacuum modes are coupled to a different one of the fourth inputs 218 to the second set of m couplings 204, and the third output 224 of the first (k=1$^{th}$) coupling in the second set of m couplings outputs the higher purity bosonic particle in response to:

the plurality N of bosonic particles being inputted to the first set of n couplings 202 so that one bosonic particle is inputted to each of the first input 212 and the second input 214 of the first set of n couplings, an absence of bosonic particles (e.g., vacuum modes) being detected at each of the first outputs 220, and one of the output bosonic particles being detected at each of the second outputs 222 of the k>1 couplings in the second set of m couplings.

Alternatively stated, the one or more third outputs output the one or more purified bosonic particles when (1) the predetermined number of bosonic particles being detected at each of the first outputs is zero; and (2) the predetermined number of bosonic particles being detected at each of the second outputs is one. The one or more purified bosonic particles each have a higher purity than any of the plurality of bosonic particles inputted to the inputs.

Figure 3:
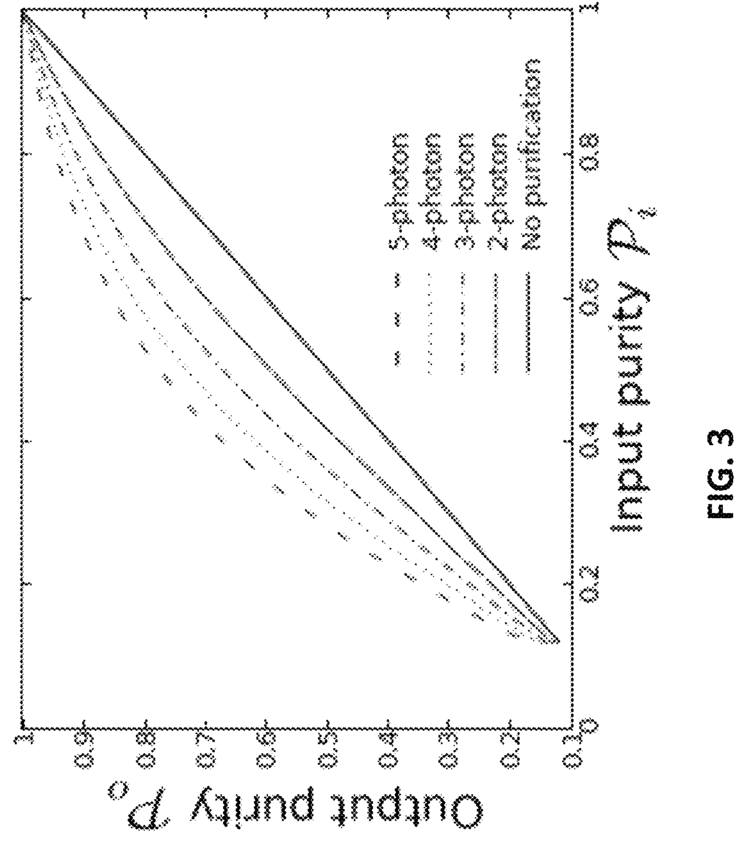
FIG. 3 illustrates output purity as a function of the number of inputs to the interferometer. Optimal purification circuits $U_{op}$ with various n are applied to a range of input states. All purification schemes improve the purity unless the initial purity is 0 (maximally mixed) or already 1 (pure).

FIG. 3 shows the purity is increased or amplified more efficiently as the number of input ports (and input bosons) is increased. While FIG. 1 and FIG. 2 illustrate examples with one third output 224, the interferometer can be generalized to a plurality of third outputs outputting a plurality of purified bosonic particles.

Third Example: Analytical Characterization of the First Example

FIG. 1 shows a 3-port linear optics network that consists of two 50:50 beam splitters, taking two single photons into the first and second input channels and requiring the measurements of a vacuum and a single photon states in the first and the third output channels by post-selections, respectively.

The input single photon state is given as a probabilistic mixture of mutually orthogonal spectral modes $$\rho_{in} = \sum_{\mu} p_{\mu} \hat{a}_{\mu}^{\dagger} |0\rangle\langle 0| \hat{a}_{\mu} \tag{1}$$

where $$\hat{a}_{\mu}^{\dagger}$$

is the creation operator for the μ-th spectral mode, and $p_{\mu}$ is the probability of finding the photon in the mode. $p_{\mu}$'s are assumed to be ordered non-increasing. For practical regime where the state is almost pure, only the first few terms with large $p_{\mu}$'s are important, and $\rho_{in}$ can be approximated as a finite dimensional density matrix in this basis.

$$\hat{a}_{\mu}^{\dagger}$$

is defined using the creation operator $\hat{c}^{\dagger}(\omega)$ of a photon with well-defined frequency ω and a wavefunction $\phi_{\mu}(\omega)$ for μ-th spectral mode, $$\hat{a}_{\mu}^{\dagger} \equiv \int \phi_{\mu}(\omega)\hat{c}^{\dagger}(\omega)d\omega.$$

The spectral modes are mutually orthogonal $\int\phi_{\mu}(\omega)^{*}\phi_{\nu}(\omega) d\omega=\delta_{\mu\nu}$, and these operators obey Bosonic commutation relations.[5]

$$[\hat{a}_{\mu}, \hat{a}_{\nu}^{\dagger}] = \delta_{\mu\nu}$$

Here, we are using ω and ω' to denote the frequency of a photon. However, most of the arguments mentioned herein are generally valid for any other internal continuous degrees of freedom such as temporal or spatial modes.

The initial state with two photons in distinct channels is given as the direct product of the two single photons, each in the first and second channels.

$$\begin{aligned} \rho_{init} &= \rho_{in,1} \otimes \rho_{in,2} \\ &= p_{\mu} p_{\nu} \hat{a}_{\mu,1}^{\dagger} \hat{a}_{\nu,2}^{\dagger} |0\rangle\langle 0| \hat{a}_{\mu,1} \hat{a}_{\nu,2} \end{aligned} \tag{4), (5}$$

In this particular case, the first subscripts and ν runs over all discrete spectral modes and the second subscripts 1,2 denotes the spatial channel. However, without loss of generality, we may assume that the second indices also include discrete polarization modes because the polarization qubits and dual rail qubits are interchangeable using polarization beam splitters. [6] The unitary matrix of the two beam splitters in FIG. 1 can be calculated by multiplying unitary matrices for individual beam splitters.

$$U = \begin{pmatrix} 1/\sqrt{2} & 1/2 & 1/2 \\ -1/\sqrt{2} & 1/2 & 1/2 \\ 0 & -1/\sqrt{2} & 1/\sqrt{2} \end{pmatrix} \tag{6}$$

In Heisenberg picture, the evolution of n-photon density matrix can simply described by following rules [6,7]:

$$U: \hat{a}_{\mu,i}^{\dagger} \mapsto \sum_{j} U_{ij} \hat{a}_{\mu,j}^{\dagger}$$

Now applying these rules, we can easily calculate the density matrix of 2-photon state after they pass through the linear optics:

$$\begin{aligned} \rho_{init} \mapsto \sum_{\mu,\nu} p_{\mu} p_{\nu} \cdot \left( \sum_{i,j=1}^{3} U_{1i} U_{2j} \hat{a}_{\mu,i}^{\dagger} \hat{a}_{\nu,j}^{\dagger} \right) |0\rangle \\ \times \langle 0| \left( \sum_{k,l=1}^{3} U_{1k}^{*} U_{2l}^{*} \hat{a}_{\mu,k} \hat{a}_{\nu,l} \right) \end{aligned} \tag{7}$$

Note that at this point, the density matrix also contains some contribution from two photon state in Fock space such as |2) in the same mode.

In this scheme, we post-select the measurements of vacuum state in the first channel and the single photon state in the third channel. Thus, we take only four corresponding terms and drop all the other, which leads to the following unnormalized two photon density matrix.

$$\rho' = \sum_{\mu,\nu} \frac{1}{16} p_\mu p_\nu \big[\hat{a}^\dagger_{\mu,2}\hat{a}^\dagger_{\nu,3} \,|\, 0\rangle\langle 0 \,|\, \hat{a}_{\mu,2}\hat{a}_{\nu,3} + \hat{a}^\dagger_{\mu,2}\hat{a}^\dagger_{\nu,3} \,|\, 0\rangle\langle 0 \,|\, \hat{a}_{\mu,3}\hat{c}_{\nu,2} + \hat{a}^\dagger_{\mu,3}\hat{a}^\dagger_{\nu,2} \,|\, 0\rangle\langle 0 \,|\, \hat{a}_{\mu,2}\hat{a}_{\nu,3} + \hat{a}^\dagger_{\mu,3}\hat{a}^\dagger_{\nu,2} \,|\, 0\rangle\langle 0 \,|\, \hat{a}_{\mu,3}\hat{a}_{\nu,2}\big] \tag{8}$$

where the factor $$\frac{1}{16}$$

comes from $U_{ij}$'s. We see that the first and the last terms describe the permutations of two input photons, namely (1→2,2→3) and (1→3,2→2), respectively. The second and third terms describe the interference of the two photons. Finally, tracing out the single photon state in the third channel, we obtain a unnormalized output density matrix for a photon in the second channel.

$$\rho'_{out} = \frac{1}{8}\sum_{\mu}\left(p_\mu + p_\mu^2\right)\cdot \hat{a}^\dagger_\mu \,|\, 0\rangle\langle 0 \,|\, \hat{a}_\mu \tag{9}$$

Note that this expression can be simply written as following:

$$\rho'_{out} = \frac{1}{8}\rho_{in} + \frac{1}{8}\rho_{in}^2 \tag{10}$$

which is independent of the choice of basis for spectral degrees of freedom. Note that two permutation terms and two interference terms contributed to the linear and quadratic terms in Eq. (10), respectively.

The trace of $$\rho'_{out}$$

gives us the success probability of the post-selected measurement outcomes, and it is bounded between ⅛ and ¼. We obtain the final density matrix $\rho_{out}$ conditioned on the success of the postselection by normalizing $$\rho'_{out}.$$

$$\rho_{out} = \frac{\rho'_{out}}{tr(\rho'_{out})} \tag{11}$$

The purity $\mathcal{P}_{out}$ of this density matrix is strictly greater than the input purity $\mathcal{P}_{in}$ unless the input photon is already pure or maximally mixed.

Without being bound by a particular scientific theory, it can be intuitively understood how the purity is improved. The purity of a density matrix can be understood as the sum of the squares of its eigenvalues, and it measures how biased the eigenvalues are; a pure state has one one non-zero eigenvalues while a mixed state has much more evenly distributed one. As the output density matrix is a polynomial in the input density matrix, so are its eigenvalues. Then, due to the quadratic term in Eq. (10), large eigenvalues are relatively increased while small ones are suppressed after normalization. Consequently, the eigenvalues are more biased in output density matrix, resulting in higher purity.

In fact, this linear circuit with two 50:50 beam splitters is optimal and produces the purest photon achievable under this scheme. We consider a general 3-port interferometer unitary:

$$U = \begin{pmatrix} U_1 & U_2 & U_3 \\ U_4 & U_5 & U_6 \\ U_7 & U_8 & U_9 \end{pmatrix}$$

Then, the final unnormalized density matrix is given by:

$$\begin{aligned} \rho'_{out} &= \left(|U_2|^2|U_6|^2 + |U_3|^2|U_5|^2\right)\rho_{in} \\ &\quad + \left(U_2U_6U_3^*U_5^* + U_2^*U_6^*U_3U_5\right)\rho_{in}^2 \\ &= a\rho_{in} + b\rho_{in}^2 \end{aligned} \tag{12), (13), (14}$$

Note that a is always positive while b is not. The purity of the corresponding normalized density matrix is improved if and only if b is positive and maximized when ratio $$\frac{b}{a}$$

is maximum [9] The ratio is always less than or equal to 1 from Cauchy-Schwarz inequality, and our scheme in FIG. 1 saturates this bound.

We also note that the output density matrix in Eq. (14) depends only on the upper right 2×2 sub-matrix of U. This is natural because we had two single photons in the first two input channels and took only terms with two single photons in the second and third output channels, each corresponding to the first two rows and the last two columns. However, the ancilla channel is still needed in order to achieve purification because otherwise the second coefficient b cannot be positive due to the constrains of U being unitary. In this particular case, we see that a single ancilla was sufficient because our scheme already saturated the ratio $$\frac{b}{a}.$$

Physically, the purification attributes to photon's bunching effect. We interpret a mixed state as a probabilistic mixture of its eigenstates, then each input photon is in one of the eigenstates with the probability equal to the corresponding eigenvalue. In this scheme, we start with the vacuum state in the third input channel and require the vacuum state in the first output channel via post-selection. Thus, two photons have to travel together in the second channel at the intermediate stage between the two beam splitters, as shown in FIG. 1. The success probability of such events is doubled if the two input photons were in the same eigenstate, as demonstrated in HongOu-Mandel effect. The likelihood of finding two identical photons in the same eigenstate is quadratically proportional to its eigenvalue. Thus, given the success of our measurement outcomes, the output photon is more likely to be in a more probable state than a less probable one, consequently improving the purity.

Fourth Example: Simulation of the Second Example a. Matrix Representation and Approximations FIG. 2 shows the circuit takes n photons in its first n input channels and has M−n anxiliary vacuum inputs for the rest. The linear optics network is given as a general M×M unitary matrix U. We require, by post-selection, the measurements of single photon states in output channels 2~n and vacuum states in channels n+1~M. The unmeasured single photon in the first output channel is used as our output photon.

The initial state has a single photon in each of the first n channels, i∈{1, . . . , n}, and the photon in t-th channel is in a spectral eigenstate $\mu_i$ with probability $p_{\mu_i}$. The total initial density matrix is given as the probabilistic mixture of all possible configurations $\vec{\mu}=\{\mu_1,\mu_2, \ldots, \mu_n\}$ of such spectral modes.

$$\rho_{init} = \sum_{\vec{\mu}}\left[\prod_{i=1}^{n} p_{\mu_i}\hat{a}^{\dagger}_{\mu_i,i} \mid 0\rangle\langle 0 \mid \prod_{j=1}^{n}\hat{a}_{\mu_j,j}\right] \tag{15}$$

where $$\hat{a}^{\dagger}_{\mu_i,i}$$

denotes the creation operator for the state in spectral mode $\mu_i$ at z-th channel.

After the linear optics network, the density matrix evolves according to Eq. (7).

$$\rho_{init} \mapsto \sum_{\vec{\mu}} A^{\dagger}(\vec{\mu}) \mid 0\rangle\langle 0 \mid A(\vec{\mu}) \tag{16}$$

with $A^{\backslash}(\vec{\mu})$ defined as following:

$$A^{\dagger}(\vec{\mu}) = \prod_{i=1}^{n}\sqrt{p_{\mu_i}}\sum_{j=1}^{M} U_{ij}\hat{a}^{\dagger}_{\mu_i,j}. \tag{17}$$

By exchanging the order of the summation and multiplication in Eq. (17), we can arrive at the following expression.

$$A^{\dagger}(\vec{\mu}) = \sum_{\sigma\in F}\prod_{i}\sqrt{p_{\mu_i}}\, U_{i\sigma(i)}\hat{a}^{\dagger}_{\mu_i,\sigma(i)} \tag{18}$$

where σ is a map from $\mathbb{Z}_n$ to $\mathbb{Z}_M$ and F is the set of all such maps. Physically, σ describes the pathway of photons from n input to M output channels. [7]

We post-select only the terms with single photons detected in each of the first n output channels. Thus, we keep all and only the maps in the symmetric group $S_n$: $\mathbb{Z}_n \to \mathbb{Z}_n$ and drop all the other contributions. Here, we identified an element s in $S_n$ as a map defined by how s permutes the input photons. Rearranging the equation, we obtain the expression for the post-selected density matrix ρ'.

$$\rho' = \sum_{\vec{\mu}}\sum_{\sigma,\lambda\in S_n}\prod_{i=1}^{n} p_{\mu_i} U_{i\sigma(i)}U^{*}_{i\lambda(i)} \times \prod_{i=1}^{n}\hat{a}^{\dagger}_{\mu_i,\sigma(i)}|0\rangle\langle 0|\prod_{j=1}^{n}\hat{a}_{\mu_j,\lambda(j)} \tag{19}$$

In order to get the density matrix for the output single photon state, we trace out single photons in channels 2~n. Tracing a channel l introduces a Kronecker delta $\delta_{\mu_i,\mu_j}$ with σ(i)=λ(j)=l, so after n−1 tracings we get the product of n−1 Kronecker deltas. After summing over all possible spectral mode configurations, we obtain the final expression for the unnormalized output density matrix:

$$\rho'_{out} = \sum_{\sigma,\lambda\in S_n} T_{\sigma,\lambda}[U]S_{\sigma,\lambda}[\rho_{in}]N\left[\rho_{in}^{m_{\sigma,\lambda}}\right] \tag{20}$$

whose trace $$tr(\rho'_{out})$$

gives us the success probability of the post-selection.

Two numbers $T_{\sigma,\lambda}[U]$ and $S_{\sigma,\lambda}[\rho_{in}]$ are transmission rate and probability weight for a photon pathway (σ,λ), respectively, and N[•] is the normalization operator, all of which are defined in the following way:

$$T_{\sigma,\lambda}[U] = \prod_{i=1}^{n} U_{i\sigma(i)}U^{*}_{i\lambda(i)}, \tag{21}$$

$$S_{\sigma,\lambda}[\rho] = tr(\rho^{n_1})tr(\rho^{n_2}) \ldots tr(\rho^{n_k}), \tag{22}$$

$$N[\rho^m] = \frac{\rho^m}{tr(\rho^m)} \tag{23}$$

where, $n_1$, $n_2$, . . . , $n_k$ are the cycle lengths in the cycle decomposition of the composite permutation n=$\lambda^{-1}\circ\sigma$, and $m_{\sigma,\lambda}$ is the length of the cycle in η containing $\sigma^{-1}(1)$. This structure arises because the measurements of single photons in n−1 output channels contract density matrices and produce the factors in $S_{\sigma,\lambda}$. The special treatment of $m_{\sigma,\lambda}$ term is due to the fact that we are using the first channel for our output, not taking the trace. The detailed derivation of this expression is provided in section V A of [9].

Eq. (20) describes the quantum interference among n photons, properly weighted by the probability for each initial configuration $\hat{\mu}$. We will see that $\eta=\lambda^{-1}\circ\sigma$ enumerates the different types of interference and $S_{\sigma,\lambda}$ provides the probability weight to each type.

$$\prod_{i=1}^{n} U_{i\sigma(i)}$$

is the quantum amplitude for n photons to follow the pathway $\sigma$ in our linear optics network U. $T_{\sigma,\lambda}$ is a cross term contribution from the absolute square of the sum of all amplitudes.

In order to understand the physical meaning of the factor $S_{\sigma,\lambda}$ in Eq. (20), let us first consider the instance where n input photons are in distinct spectral modes, i.e. $\mu_i \neq \mu_j$ for any $i \neq j \in \{1, \ldots, n\}$. In this case, by measuring the spectral mode of each output photon in channels 1 to n, we can in principle specify the permutation $\sigma \in S_n$ under which n photons are permuted from input to output channels. For this permutation $\sigma$, the quantum amplitude for n input photons to pass through the interferometer is $\Pi_i U_{i\sigma(i)}$. The probability of such permutation is given by the absolute value square of the amplitude $\Pi_i |U_{i\sigma(i)}|^2$, which is $T_{\sigma,\lambda}$ with $\sigma=\lambda$. We get the identity permutation for $\eta=\lambda^{-1}\circ\sigma=\mathbb{I}$, and m is always 1. In our setup, the situation that only leads to instances where all photons are distinguishable is the one where each input photon is in the maximally mixed state $\tilde{\rho}(\omega,\omega') \propto \delta(\omega-\omega')$. In this case, $tr(\rho^m)=0$ for all $m \geq 2$, and we confirm that Eq. (20) indeed produces non-zero contribution only when $\eta=\mathbb{I} \Leftrightarrow \sigma=\lambda$. The output photon state remains the same as input, $\rho_{out}=\rho_{in}$.

Now, consider the instances where all photons are in the same state, i.e. $\mu_i=\mu_j$ for any $i, j \in \{1, \ldots, n\}$. Due to the indistinguishability of photons, we cannot have the information about individual photon's pathway, and the quantum amplitudes of different pathways interfere each other. Thus, the probability of finding single photons in channels 1 to n is given as the absolute value square of the sum of quantum amplitudes for all pathways.

$$\left|\sum_{\sigma}\prod_{i} U_{i\sigma(i)}\right|^2 = \sum_{\sigma,\lambda} T_{\sigma,\lambda}[U] \tag{24}$$

The probability contains contributions from all pathways $(\sigma,\lambda)$, and $\eta$ varies over all elements in $S_n$. This situation corresponds to having pure input states $\rho_{in}=|\psi\rangle\langle\psi|$, in which case $$\rho_{in}^m = \rho_{in}$$

for any m. Then, $S_{\sigma,\lambda}[\rho]=1$ for any $(\sigma,\lambda)$, and we again find that Eq. (20) reproduces the correct probability in Eq. (24).

Finally, we consider intermediate instances, where only some of the input photons are in same states. In order to describe such input configurations, we introduce Indistinguishability Configuration (IC), which is a partition of n photons by grouping identical photons together. As an example, (1,3,6,7)(2,5)(4) means that the photons in channel 1, 3, 6, and 7 are in the same spectral modes and the photons in channel 2 and 5 are in the same spectral modes, etc. Here, the order does not matter. However, we do not require that the photons in two different groups be distinct, so any $\vec{\mu}$ that has the previous IC can be also understood as (1,3)(2,5)(6, 7)(4). Hence, for a given input configuration $\vec{\mu}$, the corresponding IC is not unique, and any $\vec{\mu}$ can be understood as (1)(2)(3), . . . (n). Note that a $\vec{\mu}$ with n identical photons can be understood as any ICs and a $\vec{\mu}$ with n distinct modes can be only understood as (1)(2)(3) . . . (n).

Now consider an input configuration a with corresponding ICs, $\{w_\alpha\}$. The quantum amplitudes for pathways $\sigma$ and $\lambda$ will interfere each other if and only if $\sigma$ and $\lambda$ differ only by a permutation of identical photons, i.e. $\sigma=\lambda\circ\eta=\lambda^{-1}\circ\sigma$, where $\eta$ permutes photons only within the parenthesis of a $w_\alpha$. Note that the cycle decomposition of such $\eta$ must coincide with one of the IC's for $\vec{\mu}$, which we denote as, $w_\eta$. In other words, for a given $\eta$, the pathway $\sigma$ and $\lambda=\sigma\circ\eta^{-1}$ interfere each other if and only if the cycle decomposition of $\eta$ is an IC for the input configuration $\vec{\mu}$. The probability that $\vec{\mu}$ can be understood as $w_\eta$ is given as $S_{\sigma,\lambda}$ in Eq. (22) with $\eta=\lambda^{-1}\circ\sigma$ because the probability of k photons being in the same spectral modes is given as $tr(\rho^k)$. Therefore, the probability of finding single photons in channels 1 to n is given as the absolute square of the sum of quantum amplitudes for all pathways $\sigma \in S_n$, but each interference type $\eta=\lambda^{-1}\circ\sigma$ is weighted by the probability that the initial configuration $\vec{\mu}$ may experience the type. Recall that the maximally mixed input photon states had nonzero $S_{\sigma,\lambda}$ only for $\sigma=\lambda \Leftrightarrow \eta=\mathbb{I}$ as they do not interfere and that the pure input photon states had full support for all types interferences.

We observe that, as in the two photon purification scheme, the output density matrix is given as a degree n polynomial in the input density matrix. Also, the final expression for the density matrix depends only on the n×n sub-matrix of the bigger M×M unitary U.

$$U = \begin{pmatrix} V & A \\ n \times n & C \\ B & C \end{pmatrix} \tag{25}$$

We call this sub-matrix V, and the purification can be achieved and optimized by carefully choosing V (or U). More specifically, we would like to have large positive coefficients $T_{\sigma,\lambda}[U]$ for high power terms $m_{\sigma,\lambda}>1$ since they increase the purity of the output photon state.

The M−n auxiliary vacuum channels are necessary because they allow more degrees of freedom for V. In fact, it turns out that we do not need more than n−1 auxiliary channels for our purposes, which is proved in [9].

b. Optimal Linear Optical Purification

Practical applications are mostly interested in the case where the input photon is near pure state $\mathcal{P}_{in}=1-r$ with $r \ll 1$. We found an optimal linear optics network $U_{op}$ that maximizes the output purity $\mathcal{P}_{out}$ in this limit. Our $U_{op}$ guarantees the increase of purity for any mixed single photon state (not necessarily near pure state) unless it is maximally mixed or already pure. In fact, numerical simulations support that $U_{op}$ is also optimal for arbitrary input state $\rho_{in}$. Furthermore, the number of linear optical devices required for the scheme scales linearly in the photon number n, so it is resource efficient for experimental implementations.

The circuit of FIG. 2 consists of two identical n-port beam splitters $U_0$, each of which has n−1 beam splitters with different reflection-transmission ratios. We can choose the ratios of individual beam splitters such that the n port beam splitters has the unitary elements $$(U_0)_{\alpha\beta} = \frac{1}{\sqrt{n}} e^{2\pi i(\alpha-1)\beta/n}.$$

Then, the total unitary U has the following form:

$$U = \begin{pmatrix} A & 1/n & \dots & 1/n \\ \vdots & \ddots & & \vdots \\ & 1/n & \dots & 1/n \\ B & & C & \end{pmatrix} \quad (26)$$

Since we start with single photons in input channels 1 to n and post-select single photons coming out from the last n output channels, only the top right n×n sub-matrix V is relevant for the calculation of the output density matrix. Note that our unitary U has the same value 1/n for all entries in V. Thus, $$T_{\sigma,\lambda} = \frac{1}{n^{2n}}$$

for any σ,λ and Eq. (20) becomes degree n polynomial with all positive coefficients. The photon state is purified [9].

We can show that this circuit is optimal when $\mathcal{P}_{in}$ is close to 1. For this analysis, suppose that $\rho_{in}$ has eigenvalues $1-p_0, p_1, p_2, \ldots$ in non-increasing order with $p_0=\Sigma p_i$. We do not need further information other than eigenvalues of $\rho_{in}$ because $\rho_{out}'$ and $\rho_{in}$ are diagonal in the same basis. Then, we have $$\mathcal{P}_{in} = 1 - r = (1-p_0)^2 + \sum_{i=1}^{\infty} p_i^2 \quad (27, 28)$$

If r<<1, we have $$p_0 = \frac{1}{2} r + O(r^2)$$

and $p_i=O(r)$. For the rest of the calculation we only keep up to the linear order in r or $p_0$. To simplify the expressions, we re-write Eq. (20) with new index $i=(\sigma,\lambda)\in S_n \times S_n$ and use short notations $T_i, S_i$, and $\rho^{(m_i)}$ for $T_{\sigma,\lambda}[U]$, $S_{\sigma,\lambda}[\rho_{in}]$, and $$N[\rho_{in}^{m_i}],$$

respectively:

$$\rho_{out}' = \sum_i T_i S_i \rho^{(m_i)} \quad (29)$$

For any $m_i \geq 2$, we can easily see that $\rho^{(m_i)}=\rho_{pure}+O(r^2)$ has eigenvalues 1,0,0, . . . up to the linear order in r. Thus, we have $$\rho_{out}' = \sum_{\{i:m_i=1\}} T_s S_i \rho_{in} + \sum_{\{i:m_i\geq 2\}} T_i S_i \rho_{pure} + O(r^2) = A\rho_{in} + B\rho_{pure} + O(r^2) \quad (31)$$

where we defined new variables $$A = \sum_{\{i:m_i=1\}} T_s S_i \qquad B = \sum_{\{i:m_i\geq 2\}} T_i S_i \quad (33)$$

Now, the output purity $$\mathcal{P}_{out} = \frac{tr(\rho_{out}'^2)}{tr(\rho_{out}')^2}$$

can be written in terms of $p_0$:

$$\mathcal{P}_{out} = \frac{A^2(1-2p_0) + B^2 + 2AB(1-p_0)}{(A+B)^2} + O(r^2) \quad (34)$$

Here, we see that in the regime r<<1, the output purity only depends on the principal eigenvalue $1-p_0$ and is independent from detailed eigenvalue distribution $p_i$'s.

The optimal circuit is achieved by minimizing $1-\mathcal{P}_{out}=r'$ $$1 - \mathcal{P}_{out} = r' = \frac{2A}{A+B} p_0 + O(r^2) \quad (35)$$

Here, note that A and B may have dependence in r since $S_i=tr(\rho^{n_1}) \ldots tr(\rho^{n_k})$ depends on r. However, up to the linear order in r (or $p_0$), these dependences are irrelevant, and the U is optimal when $$\lim_{r\to 0} \frac{A}{A+B}$$

is minimized. Note that in the limit $r\to 0$, $S_i=1$. Thus, the values of A+B and A do not depend on the initial density matrix. Using the definitions of A and B and Eq. (21), we can rewrite A+B and A in terms of the sub-matrix V defined as in Eq. (25):

$$A + B = \sum_{\sigma,\lambda\in S_n} T_{\sigma,\lambda}[V] = |perm(V)|^2 \quad (36)$$

where perm(•) is the permanent of a matrix defined by $$perm(M) = \sum_{\sigma\in S_n} \prod_{i=1}^{n} M_{i\sigma(i)} \quad (37)$$

This structure follows from our definition of $T_{\sigma,\lambda}$ and is the consequence of bosonic statistics. The emergence of permanent in linear optics system and its application in complexity theory have been studied in Ref [8].

Now we evaluate A in Eq. (32), in which the summation runs only over (σ,λ) such that $m_{\sigma,\lambda}=1$. This constrain means that the length of the cycle in $\eta=\lambda^{-1}\circ\sigma$ containing $\sigma^{-1}(1)$ must be 1, i.e. $\eta(\sigma^{-1}(1))=\sigma^{-1}(1) \Leftrightarrow \lambda^{-1}(1)=\sigma^{-1}(1)$. Therefore, we can rewrite the summations as following:

$$\sum_{\substack{\sigma,\lambda \\ m_{\sigma,\lambda}=1}} \mapsto \sum_{l\in\mathbb{Z}_n}\sum_{\sigma',\lambda'\in S_{n-1}} \tag{38}$$

where $l=\lambda^{-1}(1)=\sigma^{-1}(1)$ runs over $\mathbb{Z}_n$, and, for a fixed l, σ' and λ' run over all permutations of the remaining n−1 photons. The result can be simply written in terms of the permanents of the sub-matrices of V $$A = \sum_{\substack{\sigma,\lambda \\ m_{\sigma,\lambda}=1}} T_{\sigma,\lambda}[V] = \sum_i^n |V_{i,1}|^2 \cdot \left|perm(\tilde{V}_{i,1})\right|^2 \tag{40}$$

where $\tilde{V}_{i,1}$ is a n−1×n−1 matrix formed by omitting i-th row and the first column of V. Finally, we substitute $z_i = V_{i,1} \cdot \mathrm{perm}(\tilde{V}_{i,1})$ and use the recursive property of permanent to obtain:

$$\frac{A}{A+B} = \frac{\sum_i |z_i|^2}{\left|\sum_i z_i\right|^2} \geq \frac{\sum_i |z_i|^2}{\left(\sum_i |z_i|\right)^2} \geq \frac{1}{n} \tag{41}$$

where the first inequality comes from Triangle inequality and the second one from Cauchy-Schwarz inequality. Our $U_{op}$ defined by Eq. (26) saturates this bound, hence it is optimal.

Interestingly, there are various numerical supports that $U_{op}$ is also optimal for any arbitrary input density matrix, not necessarily near pure state. This result is surprising because we are optimizing U to maximize the output purity for a given input state $\sigma_{in}$, but the solution $U_{op}$ seems to be independent of $\rho_{in}$. In fact, we can analytically show that our ansatz optimal $U_{op}$ is at least local optimal. Without loss of generality, we may assume that elements in n×n sub-matrix V are independent variables if we allow arbitrarily many ancilla channels (Appendix V C of [9]). It can be shown that the derivative of the output purity with respect to an element $v_{ij}$ vanishes at our solution for any $\sigma_{in}$. Also, numerical simulations of randomly generated unitary matrices suggests the optimality of our ansatz $U_{op}$. For n=3 photon interferometer, 5×5 unitary matrices are randomly generated according to Haar measure, and the output purity from each unitary circuit with an arbitrary $\rho_{in}$ is calculated and compared with that from our $U_{op}$ solution. In our simulation, we generated 4,000,000 random unitary matrices, and none of the interferometers produced greater output purity than $U_{op}$ does. Also, the histogram of purities from the samples showed the number of samples was large enough to cover the entire space with sufficient density. A similar simulation focused on the vicinity of the $U_{op}$ confirmed the local optimality [9]. Finally, simulated annealing optimizations support our conjecture. Simulations with different annealing schedules produced optimized unitary circuits, all of which had output purities converging to that from $U_{op}$ solution (see appendix of the priority application [9])

Without being bound by a particular scientific theory, the independence of the optimal unitary circuit from input states can be understood in the following physical interpretation. The purification of our scheme attributes to the terms with high power ≥2 in Eq. (20), e.g. the quadratic term in two photon purification scheme. Here, recall that the high order terms arise because of the indistinguishability of photons as described in the previous section. Thus, the optimal unitary must maximize the contribution from terms with indistinguishable photons. As in the two photon purification scheme in the previous section, our protocol post selects the vacuum detections in n−1 output channels in FIG. 2. In this process, we are effectively taking only the instances where all n photons travel together on top of each other at the highlighted part (red) of the diagram. Due to the bosonic bunching nature, the success probability of such an event is greater if there were more indistinguishable photons among n initial photons. Thus, conditioned on the post-selection, we obtain relatively more contribution from high order terms, and our $U_{op}$ is designed to maximally utilize this feature.

In fact, it is shown in [9] that any linear optics network U with an intermediate stage where n photons travel together on a single channel produces the same output purity $\mathcal{P}_{out}$ as the one from our $U_{op}$ solution. For example, we can replace $U_0$ in FIG. 3 with arbitrary unitary and still have the same output purity as long as the success probability is non-zero. Among such U's, our unitary $U_{op}$ is chosen to maximize the success rate of the protocol for pure input states.

c. Purification Performance

The performance of the purification has been analyzed. For numerical calculations, we modeled the single photon state from a photon source with Lorentzian homogenous broadening and Gaussian inhomogeneous broadening. Such photon sources include quantum dot and fluorescence based sources. [7]

$$|\psi_\omega\rangle = \int d\omega' \frac{\sqrt{\gamma/\pi}}{(\omega'-\omega)-i\gamma}\hat{c}^\dagger_{\omega'}|0\rangle \tag{42}$$

where ω is the frequency and γ is the line-width. Note that $|\psi_\omega\rangle$ is pure state and properly normalized.

In many realistic systems, the center of the spectrum to is fluctuating with some uncertainty σ. This instability arises from various reasons such as thermal fluctuation of a cavity or the jittering of trapped atoms[7]. Such fluctuations can be effectively described by the gaussian distribution. The density matrix for a single photon is given by:

$$\rho_{\mathrm{in}} = \int d\omega \frac{1}{\sqrt{2\pi}\,\sigma} e^{-\frac{1}{2}\frac{(\omega-\omega_0)^2}{\sigma^2}} |\psi_\omega\rangle\langle\psi_\omega| \tag{43}$$

with the mean frequency $\omega_0$ and the variance $\sigma^2$. We assume that the line-width and thermal fluctuation is sufficiently smaller than its mean frequency γ, $\sigma \ll \omega_0$, so that we can extend the integration from −∞ to ∞. In this model, the entire profile including purity of the density matrix $\rho_{in}$ depends only on a single parameter γ/σ

FIG. 3 shows the output purities $\mathcal{P}_o$ from various input values $\mathcal{P}_i$ for n=2,3,4,5-photon purification schemes with optimal solution $U_{op}$. We see that our scheme purifies any input state $\mathcal{P}_o > \mathcal{P}_i$ unless $\mathcal{P}_i$=1 or 0. Purification with more photons produces strictly greater output purity.

Figure 4:
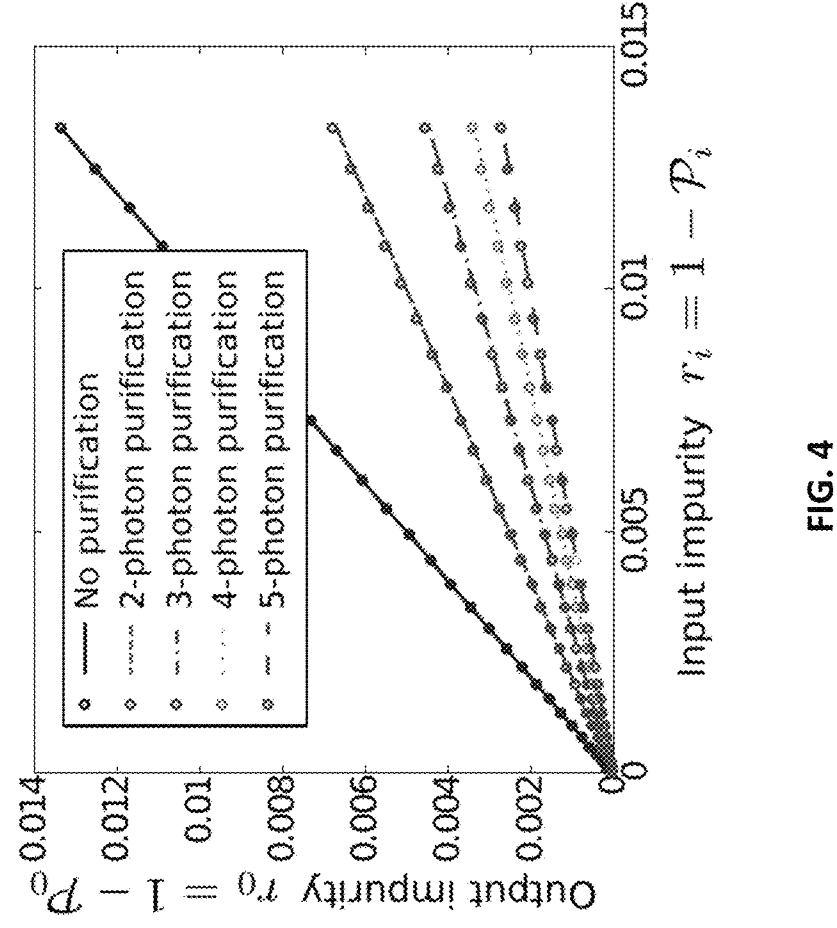
FIG. 4. Performance of the purification by $U_{op}$ circuit when the input is near pure state. Each line corresponds to different n photon purification scheme. Simulation data points are denoted by circles. We see the good agreement between analytical and numerical.

The purification performance of input states in the vicinity of pure state, $\mathcal{P}_i = 1-r$ with $r \ll 1$, is shown in FIG. 4. Note that our circuit $U_{op}$ is optimal in this regime, and the purification performance does not depend on the details of eigenvalue distribution, i.e. the types of photons source, as explained in the previous section. From Eq. (35) and (41), we get the output purity as a function of input purity when $U_{op}$ is used:

$$1-\mathcal{P}_0 = r' = \frac{1}{n}r = \frac{1}{n}(1-\mathcal{P}_i) \tag{44}$$

We see that n photon purification with $U_{op}$ suppress the impurity $r=1-\mathcal{P}$ by the factor of $$\frac{1}{n}.$$

Figure 5:
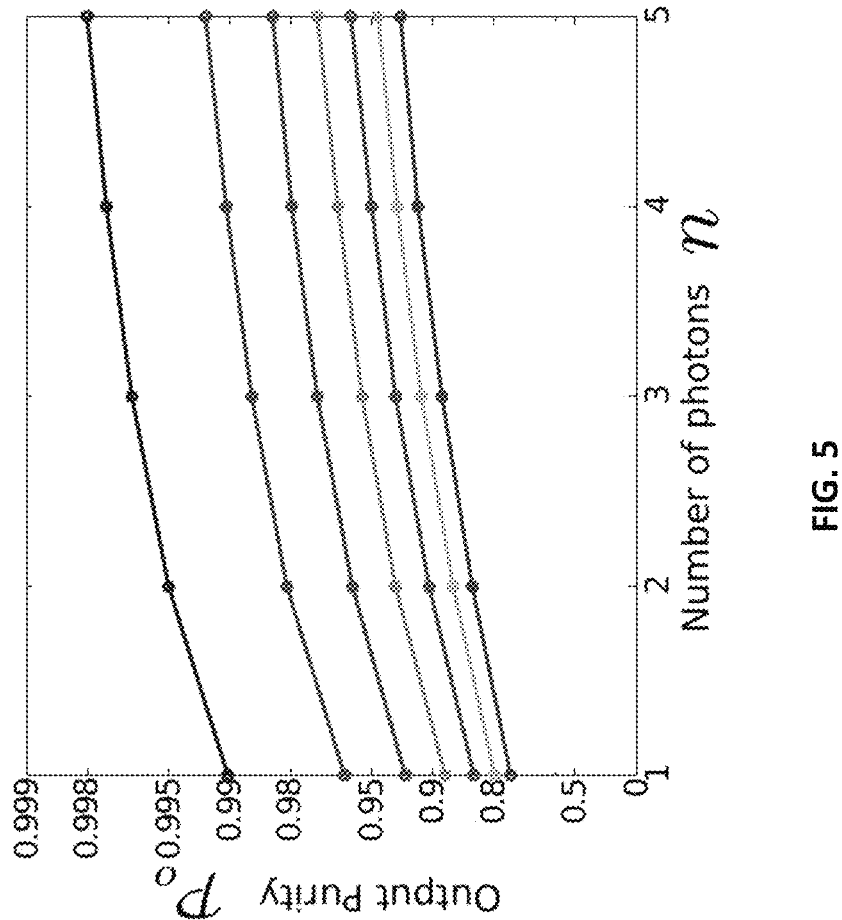
FIG. 5. The purities of photons with seven different initial purities are increased as purification schemes with various n are applied. Note that the vertical axis has inverted.

The numerical simulation well agrees with the analytical prediction as shown in FIG. 4. Finally, FIG. 5 provides the practical information for experimental relevance. It shows which purification scheme with how many photons we should use in order to achieve a target purity for a given input single photon purity. The points with n=1 corresponds to no purification, and we see that purities are better improved by purification with more photons. We can simply read out, for an example, that a photon source with $\mathcal{P}$ ~0.990 can be purified to $\mathcal{P}$ ~0.998 if we apply 5-photon purification scheme in 9-port linear optical circuit. Recall that even though our numerical simulation is based on the solid state-based photon source, this purification performance is independent from detailed information of input photon profile when it is near pure state.

The success probability $p_{success}$ of the protocol decreases exponentially in n. The $p_{success}$ of the post-selection is given by the trace of the unnormalized output density matrix $$tr(\rho'_{out}),$$

and this value depends on both the linear optics network U and input photon profile $\rho_{in}$ as in Eq. (20). In the limit, $\mathcal{P}_i=1$, we have $p_{success}=|\text{perm}(V)|^2$ where V is the relevant sub-matrix of U. For the n-photon purification with our optimal 2n−1 port linear circuit $U_{op}$, we have $$V_{ij} = \frac{1}{n}$$

and $$p_{succss} = \left(\frac{n!}{n^n}\right)^2 \sim 2\pi n e^{-2n}$$

when n is large. Thus, for the example of purifying $\mathcal{P}_i$~0.990→$\mathcal{P}_o$~0.998, the success probability is $p_{success}$~0.0014, it might appear we need repeat the experiment ~690 times on average in order to obtain one successful output photon. However, the output photon is heralded by n−1 single photons detectors. Thus, this purification scheme can be very useful where one needs a single photon with high purity and the procedure or experiment need not be repeated (in some embodiments/applications).

d. Numerical Simulations

Figure 6:
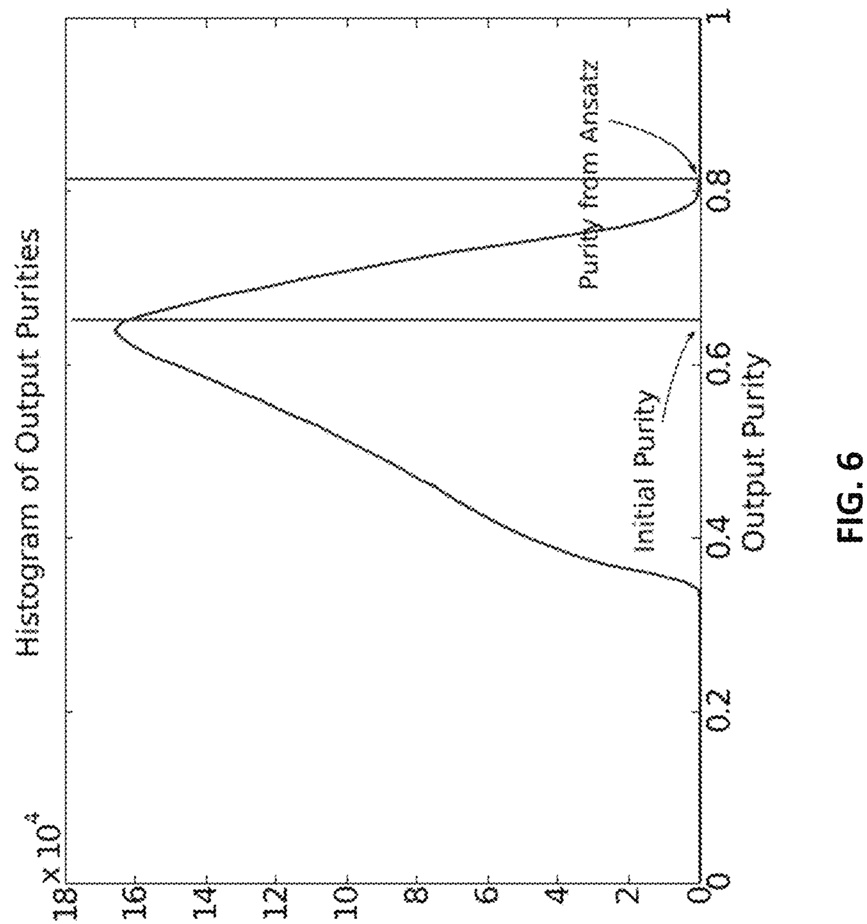
FIG. 6 is a histogram of purities, wherein the initial purity and the purity from our ansatz solution are marked with vertical red lines at 0.653 and 0.815, respectively.
Figure 7:
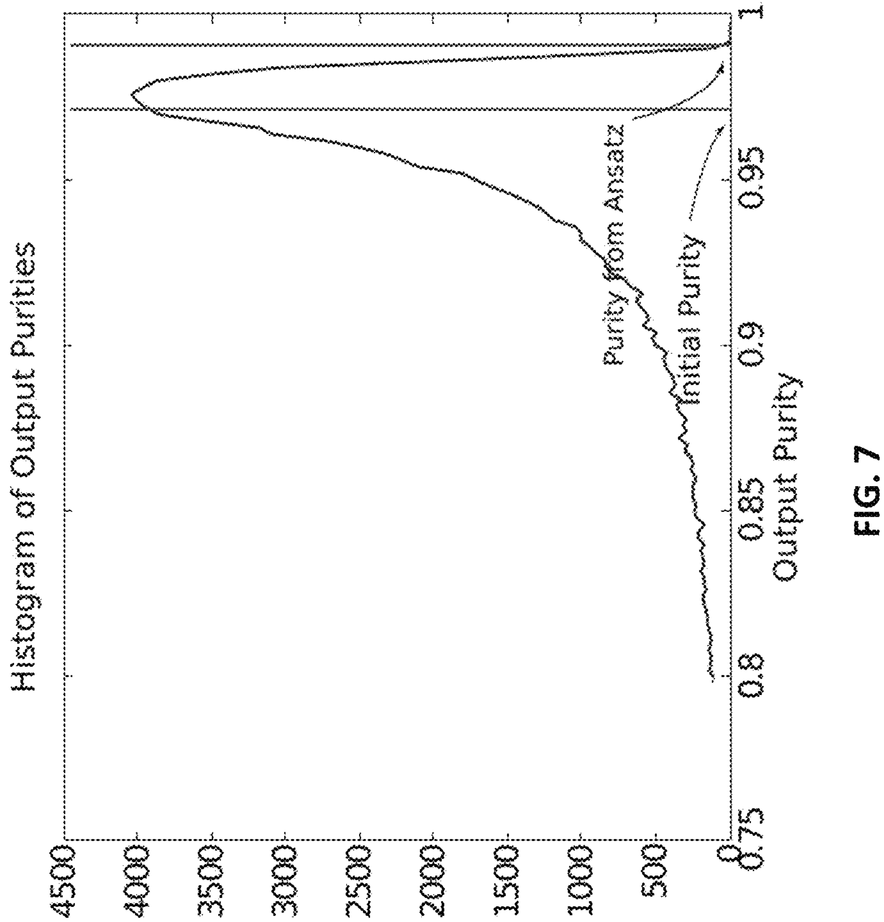
FIG. 7 is the same simulation as in FIG. 6 but with different initial purity ~0.971
Figure 8:
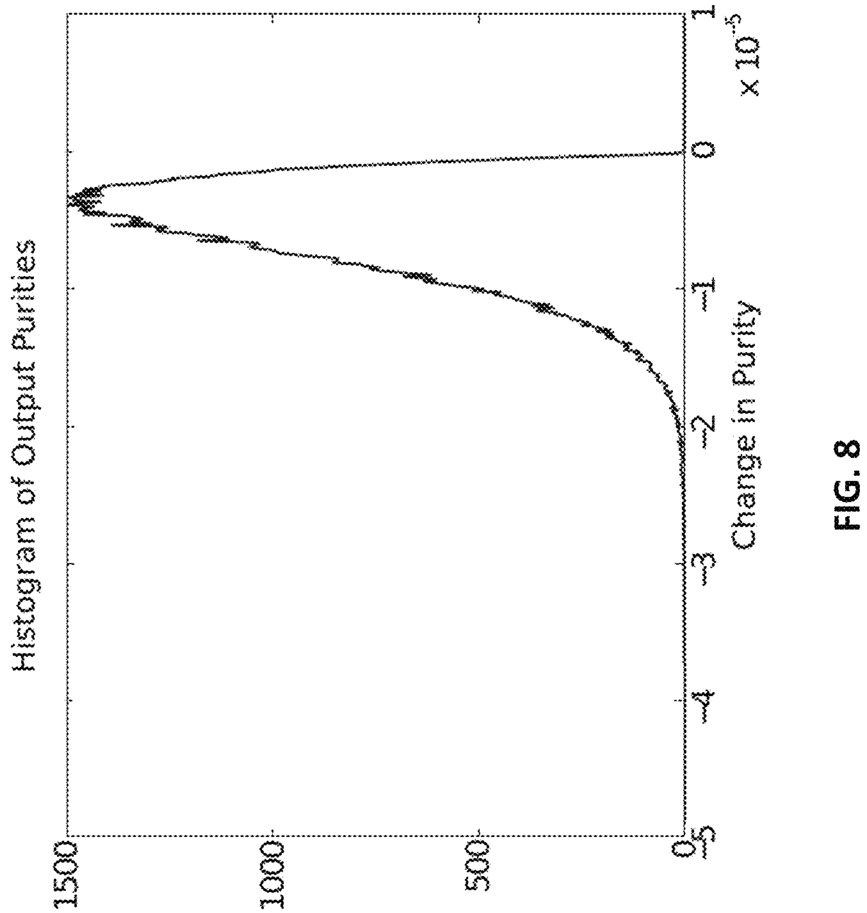
FIG. 8 shows a histogram of purities from $V_d$'s with respect to the relative change in purity from ansatz solution.

The optimality of our ansatz unitary is supported by various numerical calculations. Numerical calculations are mainly done with a photon source modeled after Eq. (42) and Eq. (43) with various γ/σ ratio, i.e. different initial purity values. First, we generated 4,000,000 random 5×5 unitary matrices and calculated the output purity for each unitary circuit from an input state of purity $\mathcal{P}$=0.653. The histogram of the purities is shown in FIG. 6. The initial purity and the purity from our ansatz solution are marked with vertical red lines at 0.653 and 0.815, respectively. We see that ~27% of unitary circuits improve the purity. The largest output purity achieved from those samples is 0.812, which together with the smooth tail of the distribution suggests that the number of random samples is large enough to cover our search space with sufficient density. The same simulation with different initial purity 0.971 produced qualitatively the same result, as shown in FIG. 7. The vicinity of the ansatz unitary has been also studied. As the output density matrix depends only on the n×n sub matrix V, we generated a slightly deviated sub matrix $V_d$ from our ansatz solution $V_a$ by adding a random n×n matrix $\delta V_r$, where $$\delta = \frac{1}{100}$$

and each element in $V_r$ is a complex random number uniformly distributed from −1 to 1 and −i to i. The output purities from 100,000 such $V_d$'s were compared with the purity from our ansatz, and none of them improved purity. This result confirms that our ansatz is local optimum. The histogram of purities from $V_d$'s with respect to the relative change in purity from ansatz solution is shown in FIG. 8.

Finally, we numerically optimized the sub matrix V using simulated annealing and compared the result with our ansatz. The simulation consists of T=3000 time steps and begins with an arbitrary n×n matrix $V_{opt}=V_0$ and an optimum purity $$\mathcal{P}_{opt} = tr\left(\rho_{in}^2\right).$$

Figure 9:
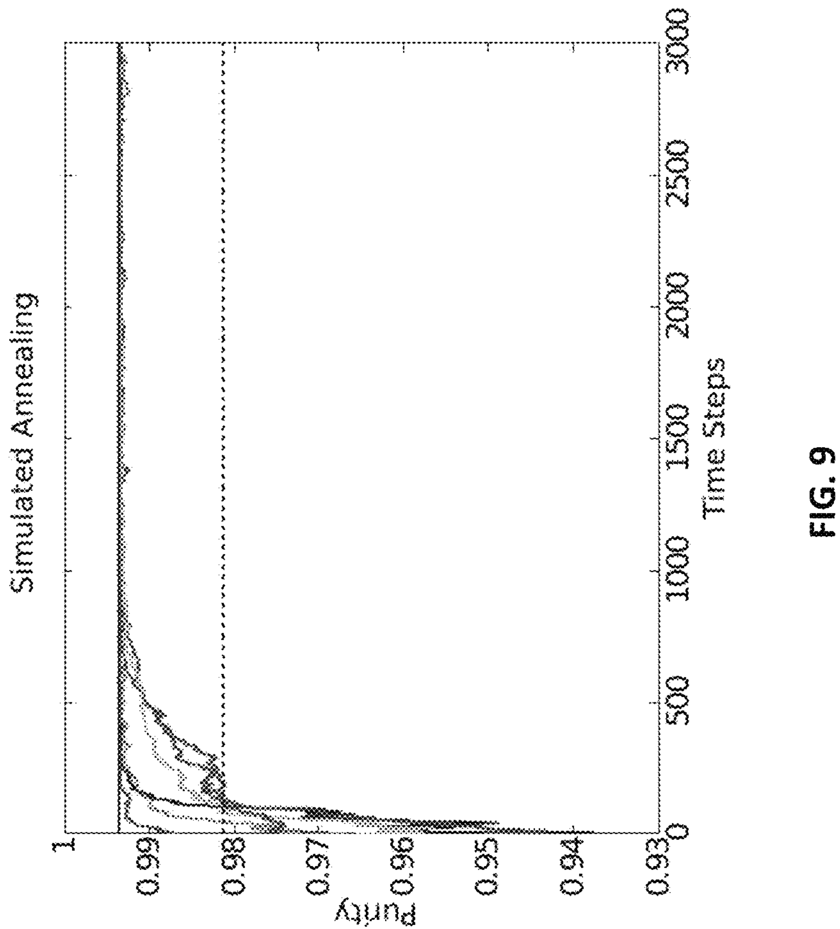
FIG. 9 shows six different purity optimization curves with randomized starting points $V_0$.

At each step i, the sub matrix is varied by $V_i=V_{opt}+\delta V_r$ as in the previous simulation, and new purity $\mathcal{P}_i$ from $V_i$ is compared with $\mathcal{P}_{opt}$. If $\Delta\mathcal{P}_i=\mathcal{P}_i-\mathcal{P}_{opt}>0$, we always update our optimum solution $V_{opt}=V_i$ and $\mathcal{P}_{opt}=\mathcal{P}_i$, while if $\Delta\mathcal{P}_1\leq 0$, we update $V_{opt}$ and $\mathcal{P}_{opt}$ with probability $$p = \frac{\exp\left(\frac{\Delta\mathcal{P}_i}{\tau(t)}\right)}{1+\exp\left(\frac{\Delta\mathcal{P}_i}{\tau(t)}\right)}$$

where τ(t) is the temperature schedule that is linearly decreasing in time t. This probability enables the annealing process to move backward so that it avoids being stuck in a local extremum. FIG. 9 shows six different purity optimization curves with randomized starting points $V_0$. The initial purity and ansatz purity are indicated by a dotted and a solid blue horizontal lines. We see that all optimization quickly converges to our ansatz, but do not exceed it. The convergence of curves from different starting points with a few backward moves strongly suggest the global optimality of our ansatz.

Process Steps

Method of Making an Interferometer

Figure 10:
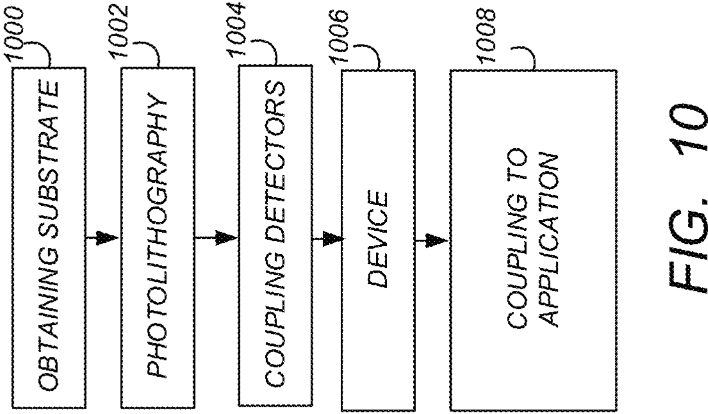
FIG. 10. Flowchart illustrating a method of making the device.

FIG. 10 is a flowchart illustrating a method of making a device useful for purifying bosonic particles.

Block 1000 represents obtaining a platform/wafer comprising a silicon substrate, an insulator layer (e.g., silicon dioxide) on the silicon substrate, and silicon or silicon nitride on the insulator layer.

Block 1002 represents depositing a mask on the silicon or silicon nitride layer and photolithographically patterning the interferometer structure (e.g., of the first or second examples illustrated in FIG. 1 or FIG. 2) in the silicon on the insulator layer. In one or more examples, the couplers each comprise coupled waveguides or a Mach Zehnder Interferometer (MZI). Each MZI comprises a pair of arms and a plurality of electrooptic modulators, each electro-optic modulator coupled to a least one of the arms so as to modulate a phase of the mode of the particle in at least one of the arms in response to a voltage signal applied to the modulator. The MZIs are connected to each other and/or inputs and outputs via waveguides. The voltage signal can be controlled using an electronic circuit and/or computer (e.g., processor or ASIC) or controller, for example.

Block 1004 represents coupling photon detectors to the outputs of the interferometer.

Block 1006 represents the end result, a device useful for purifying photons.

Block 1008 represents optionally coupling the device in an application.

Example devices can be embodied in many ways including, but not limited to, the following (referring also to FIGS. 1-10).

1. A device, comprising:

an interferometer 100, 200:

interfering a plurality of bosonic particles 201 at one or more inputs 212 so as to form a plurality of outputs comprising one or more first outputs 220, 104, one or more second outputs 222, 110, and one or more third outputs 112, 224; and one or more detectors 299, 150:

detecting an absence or presence of a bosonic particle at each of the one or more first outputs 220,104 and the one or more second outputs 222, 110; and wherein one or more purified bosonic particles are selected at the one or more third outputs 224, 112 if a predetermined number of the bosonic particles are detected at each of the one or more first outputs 220, 104 and the one or more second outputs 222, 110.

2. The device of example 1, wherein the predetermined number can be different at each of the first outputs 220 and at each of the second outputs 222.

3. The device of example 1, wherein the plurality of bosonic particles 201 are in a plurality of different bosonic modes.

4. The device 100 of example 1, wherein:

the plurality of bosonic particles 201 consist of two bosonic particles including a first bosonic particle in a first input mode and a second bosonic particle in a second input mode, the interferometer 100 interferes the plurality of bosonic particles with one vacuum mode 298, comprising an absence of a bosonic particle, in a third input mode, and the first outputs 104 comprise one first output, the second outputs 110 comprise one second output, the predetermined number of bosonic particles in the one first output is zero, and the predetermined number of bosonic particles in the one second output is one.

5. The device 100 of example 4, wherein:

the interferometer further comprises a first coupling 102 and a second coupling 108, the first bosonic particle interferes with the second bosonic particle in the first coupling, and an intermediate output 106 of the first coupling 102 interferes with the one vacuum mode in the second coupling 198.

6. The device of example 5, wherein:

the inputs consist of one first input 105 inputting from a first path 1 to the first coupling 102, one second input 107 inputting from a second path 2 to the first coupling 102, and one third input 109 inputting to a third path 3;

the one or more third outputs comprise one third output 112;

the first coupling 102 coupling between the first path 1 and the second path 2:

interferes the first bosonic particle transmitted in the first path 1 with the second bosonic particle transmitted in the second path 2, so to form an interference, and outputs to the one first output 104 and an intermediate output 106 connected to a fourth path 4;

the second coupling 108 coupling between the third path 3 and the fourth path 4:

interferes the intermediate output 106 transmitted in the fourth path 4 with the one vacuum mode transmitted in the third path 3, and outputs to the one second output 110 and the one third output 112;

the one third output 112 outputs the one purified bosonic particle in response to the one vacuum mode (the absence of a bosonic particle) being detected at the one first output 104 and the one bosonic particle being detected at the one second output 110, and the purified bosonic particle has a higher purity than the first bosonic particle and the second bosonic particle.

7. The device of any of the examples 4-6, further comprising the one or more detectors 150 detecting the one output vacuum mode at the first output 104 in a first output mode and one bosonic particle at the one second output 110, and wherein the one third output 112 transmits the one purified bosonic particle.

8. The device of any of the examples 1-7, wherein each of the plurality of bosonic particles 201 have input modes comprising at least one of:

one or more spatial modes, or one or more modes different from a spatial mode (e.g., a polarization mode, a temporal mode).

9. The device of example 1, further comprising:

the interferometer 200 comprising a plurality of first couplings 202 and a plurality of second couplings 204, wherein the plurality of bosonic particles interfere in the first couplings 202 and an intermediate output 206 of the first couplings 202 interferes in the second couplings 204 with one or more vacuum modes.

10. The device of example 9, wherein:

the interferometer 200 includes a first plurality of paths 208 and a second plurality of paths 210;

the inputs comprise first inputs 212 and second inputs 214 inputting from the first plurality of paths 208 to the first couplings 202 and third inputs 216 and fourth inputs 218 inputting from the second plurality of paths 210 to the second couplings 204;

the outputs comprise the first outputs 220, the second outputs 222, and the one or more third outputs 224;

the first couplings 202:

couple the first plurality of paths 208 so as to interfere the plurality of bosonic particles transmitted in the first plurality of paths 208; and have the first outputs 220 and the intermediate output 206;

the second couplings 204:

interfere one or more bosonic particles from the intermediate output 206 of the first couplings 202 with a vacuum mode inputted to one of the fourth inputs 218 to form a second intermediate output 226;

couple the second plurality of paths 210 so as to interfere the vacuum modes, inputted to the second plurality of paths 210 from the fourth inputs 218, with each other and with the first intermediate output 206;

output to the second outputs 222 and the one or more third outputs 224;

the one or more third outputs 224 output the one or more purified bosonic particles when:

the predetermined number of bosonic particles being detected at each of the first outputs 220 is zero;

the predetermined number of bosonic particles being detected at each of the second outputs 222 is one; and the one or more purified bosonic particles each have a higher purity than any of the plurality of bosonic particles inputted to the inputs 212, 214.

11. The device of example 1, wherein the interferometer further comprises a first set of n couplings 202 and a second set of m couplings 204 interfering the bosonic particles and the vacuum modes, wherein:

$n \geq 2$ is the number of the first set of couplings 202, $m \geq 2$ is the number of the second set of couplings 204, and $N>2$ is the number of the bosonic particles inputted to the first set of couplings 202.

12. The device of example 11, wherein $m=n=N-1$.

13. The device of example 11 or 12, wherein:

each of the first set of n couplings 202 have the inputs comprising a first input and a second input and first coupling 202 outputs comprising one of the first outputs 220 and a first intermediate output 206, the first intermediate output 206 of the $j^{th}$ coupling in the first set of n couplings 202 is coupled to the first input 212 of the $j+1^{th}$ coupling for $1 \leq j<n$;

each of the second set of m couplings 204 have the inputs comprising a third input 216 and a fourth input 218 and two second coupling outputs selected from a second intermediate output 226, one or more of the second outputs 222, and one of the third outputs 224, the $k^{th}$ coupling in the second set of m couplings 204 has the second coupling outputs comprising one of the second outputs 222 and the second intermediate output 226, for $1<k<m$, the $k=m^{th}$ coupling in the second set of m couplings 204 has the second coupling outputs comprising two of the second outputs 222, the $k=1^{th}$ coupling in the second set of m couplings 204 has the second coupling outputs comprising the third output 224 and the second intermediate output 226, the second intermediate output 226 of the $k^{th}$ coupling in the second set of m couplings 204 is coupled to the third input 216 of the $k+1^{th}$ coupling in the second set of couplings 204 for $1 \leq k<m$, the third input 216 of the first ($k=1^{th}$) coupling in the second set of m couplings 204 is coupled to the first intermediate output 206 of the last ($n^{th}$) coupling in the first set of n couplings 202, each of the plurality of vacuum modes are coupled to a different one of the fourth inputs 218 to the second set of m couplings 204, and the third output 224 of the first ($k=1^{th}$) coupling in the second set of m couplings 204 outputs one of the purified bosonic particles in response to:

the plurality N of bosonic particles being inputted to the first set of n couplings 202 so that one of the plurality of bosonic particles is inputted to each second input 214 of the first set of n couplings and the first input 212 of the $(j=1)^{th}$ coupling, the predetermined number of bosonic particles being detected at each of the first outputs 220 is zero, and the predetermined number of bosonic particles being detected at each of the second outputs 222 of the $k>1$ couplings in the second set of m couplings is one.

14. The device of any of the preceding examples 1-13, comprising a device 300 such as a shutter, gate, or processor selecting and/or transmitting the one or more purified bosonic particles for use in an application.

15. The device of any of the preceding examples 1-14, wherein the bosonic particles 201 comprise photons and the interferometer 100, 200 interferes an electromagnetic field of the photons or vacuum mode(s) received in the inputs 212, 214, 105, 107.

16. The device example 13, wherein the detectors 150, 299 comprise one or more photodetectors detecting the one or more bosonic particles comprising photons and/or certifying the absence of bosonic particles comprising photons. The photodetectors can be single photon detectors detecting photons or a vacuum mode with single occupation mode resolution, for example.

17. The device of any of the preceding examples 5-7 or 9-13, wherein the couplings 202 204, 102, 108 each comprise a beamsplitter, a coupler, or a linear optical device capable of interfering photons or electromagnetic fields.

18. The device of any of the preceding examples 1-15, wherein a purity of the purified bosonic particles is increased by at least 1% as compared to an input purity of one or more of the plurality of bosonic particles inputted at the inputs 212, 214, 105, 107.

19. The device of any of the preceding examples 1-16, wherein the purity of the purified bosonic particles is such that purified bosonic particles outputted at the one or more third outputs 112, 224 are more indistinguishable from each other and the plurality of bosonic particles are more distinguishable than the purified bosonic particles.

20. The device of any of the preceding examples 1-17, wherein the purity of the purified bosonic particles is characterized by observation of a dip evidencing a Hong-Ou-Mandel effect in a two-photon interference measurement between the purified bosonic particles outputted from the device 100, 200, wherein the dip is larger and has higher contrast as compared to a dip, if any, measured for the two-photon interference between any two of the plurality of bosonic particles.

21. The device of any of the preceding examples 1-18, wherein the purity of the purified bosonic particles is sufficient for the purified bosonic particles to be used in quantum computing, quantum memory, quantum communication, quantum cryptography, or quantum sensing.

22. The device of any of the examples 1-19, wherein the purified bosonic particles have the purity sufficient for use as a qubit in any quantum application.

23. A photonic integrated circuit including the device of any of the preceding examples 1-20. In one or more further examples, the photonic integrated circuit is formed in a semiconductor (e.g., silicon) device 24. The circuit of examples 21 and 6 or 10 wherein the paths comprise waveguides in the photonic integrated circuit.

23. The device of any of the preceding examples 1-22, further comprising a source of the bosonic particles inputted into the interferometer. 24. The device of any of the preceding examples 1-14, 16-20, or 23, wherein the bosonic particles comprise phonons.

25. The device or method of any of the examples 1-26, wherein the higher purity bosonic particles outputted from the device are pure such that wavepackets of a plurality of the higher purity bosonic particles outputted from the device can perfectly interfere with one another.

26. The device of any of the examples 1-25 wherein bosons can have any bosonic mode. In the example wherein the bosons comprise photons, the photons can have any wavelength. In an example wherein the bosons comprise phonons, the phonons can have any wavelength. The source of bosons inputted to the interferometer can comprise a semiconductor source (e.g., comprising quantum dots emitting the photons), a source of spontaneously emitted photons, a microwave source, a source comprising atoms emitting the photons, a downconverter outputting photons using a non-linear process, and a quantum emitter comprising solid state impurities or defects (e.g., germanium vacancies in silicon) that emit photons.

27. The device of any of the examples 1-26, wherein detectors of the bosons can be any device that can detect the bosons with single occupancy number resolution. Examples include, but are not limited to, detectors comprising superconductors.

28. The device of any of the examples 1-27 further including a filter used to increase the purity of the bosonic particles from the source prior to input into the interferometer.

29. The device of any of the examples 1-28, wherein the device is based on an optical circuit and photon detectors which takes several non-pure photons as an input, and outputs a single photon with a highly improved purity. The increase in purity depends on the number of photons in the input. The device can be fully constructed using simple, readily available optical components and photon detectors.

30. The device of any of the examples 1-29, further comprising a detector 150, 299 at each of the first outputs and each of the second outputs for detecting an absence or presence of a bosonic particle at each of the one or more first outputs and the one or more second outputs.

Method of Making Purified Bosonic Particle.

Figure 11:
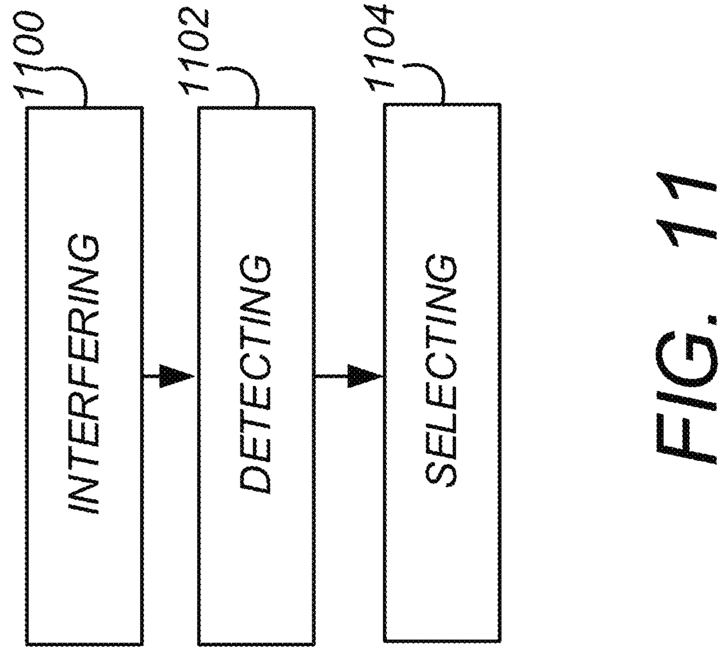
FIG. 11. Flowchart illustrating a method of making a purified bosonic particle.

FIG. 11 is a flowchart illustrating a method of making a purified bosonic particle, comprising the following steps.

Block 1100 represents interfering a plurality of bosonic particles at one or more inputs so as to form a plurality of outputs comprising one or more first outputs, one or more second outputs, and one or more third outputs.

Block 1102 represents detecting an absence or presence of a bosonic particle at each of the one or more first outputs and the one or more second outputs; and Block 1104 represents selecting one or more purified bosonic particles at the one or more third outputs if a predetermined number of the bosonic particles are detected at each of the one or more first outputs and the one or more second outputs.

The method can be implemented in a number of ways including, but not limited to, using using the device of any of the examples 1-29 set forth in the section above entitled method of making an interferometer.

Example Applications

A device according to embodiments described herein can be coupled with a source of bosonic particles to produce high-purity bosonic particles. In one or more examples, such a device is a component in a quantum computer having photonic components operating using high purity photons. This enables a reduction in the noise rate in the quantum computer. Reducing the noise rate is crucial for further progress in quantum computing. Once the error rate is reduced below a certain threshold, error correction algorithms can be employed to obtain a fault-tolerant quantum computer which can perform any type of quantum computation. Moreover, embodiments of the present invention can increase the purity of the bosonic particles without knowledge or measurement of the states (e.g., spatial or temporal quantum states) of the bosonic particles. For example, a device as described herein can measure a number state of the output photons without measuring a quantum state (e.g., polarization) of the photons used to encode quantum information. In this way, the device increases purity without destroying quantum information. Other applications of the higher purity bosonic particles produced using the interferometer described herein include, but are not limited to, quantum memory, quantum communication, quantum cryptography, or quantum sensing.

Advantages and Improvements

The only current solution to the problem of low purity photons currently relies on spectral filtering of the emitted photons. However, improving the purity using filtering requires extremely narrow bandwidth filters, which are difficult to incorporate within optical circuits. Importantly, such a narrow bandwidth is incompatible with reasonable rates of operation of quantum computers and significantly reduces the photon flux. In the case of photon sources based on semiconductor quantum dots, material improvements which reduce charge fluctuations in the semiconductor device can enhance the purity of the emitted photons. However the best purity for photons emitted from quantum dots which is reported in the literature is far from being sufficient for quantum computing purposes.

This present description is the first disclosure of a device which utilizes a principle of quantum mechanics known as "bosonic statistics" to purify spatial and temporal quantum states of photons. Our work shows that due to this principle, photon purity can be enhanced using a special type of linear optical circuits, which can be readily implemented technologically.

1) Embodiments of our methods can be readily implemented as an additional circuit to be applied to output photons generated from any existing technologies for single photon sources.

2) Embodiments of our methods are guaranteed to always output photons with improved purity compared to the purity of the input photons, regardless of the details of the quantum state of the input photons. Therefore, our method provides an unconditional improvement upon any other methods. This means that our method can be applied as an additional final step of the purification process, and is guaranteed to give an additional significant improvement in the purity of the photons.

3) Our method does not require filtering of the photons to extremely narrow bandwidth, but instead can yield purified quantum states with significant bandwidth, which is compatible with the cycle time of the quantum computer.

4) In one or more examples, the device is based on optical circuits which can be readily incorporated in quantum computing architectures.

REFERENCES

The following references are incorporated by reference herein

[1] [1] E. Knill, R. Laflamme, and G. J. Milburn, Nature 409, 46(2001)

[2] P. P. Rohde and T. C. Ralph, Phys. Rev. A 71, 032320 (2005)

[3] C. Santori, J. V. David Fattal, G. S. Solomon, and Y. Yamamoto, Nature 419, 594 (2002).

[4] T. Legero, T. Wilk, M. Hennrich, G. Rempe, and A. Kuhn, Phys. Rev. Lett. 93, 070503 (2004).

[5] P. P. Rohde, W. Mauerer, and C. Silberhorn, New Journal of Physics 9, 91 (2007).

[6] P. Kok and others, Rev. Mod. Phys. 79, 135 (2007).

[7] P. Rohde, T. Ralph, and M. Nielsen, Physical Review A 72, 052332(2005)

[8] S. Aaronson and A. Arkhipov, in Proceedings of the 43rd Annual ACM Symposium on Theory of Computing, STOC '11 (ACM, New York, N.Y., USA, 2011) pp. 333-342.

[9] Appendix of the priority application U.S. Provisional Application Ser. No. 63/287,295, filed on Dec. 8, 2021, by Netanel H. Lindner, Soonwon Choi, and John P. Preskill, entitled "OPTICAL CIRCUITS FOR PURIFICATION OF SINGLE PHOTON STATES".

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A device, comprising:

an interferometer:

interfering a plurality of bosonic particles at one or more inputs so as to form a plurality of outputs comprising one or more first outputs, one or more second outputs, and one or more third outputs; and one or more detectors:

detecting an absence or presence of a bosonic particle at each of the one or more first outputs and the one or more second outputs; and wherein one or more purified bosonic particles are selected at the one or more third outputs if a predetermined number of the bosonic particles are detected at each of the one or more first outputs and the one or more second outputs.

2. The device of claim 1, wherein the predetermined number can be different at each of the first outputs and at each of the second outputs.

3. The device of claim 1, wherein the plurality of bosonic particles are in a plurality of different bosonic modes.

4. The device of claim 1, wherein:

the plurality of bosonic particles consist of two bosonic particles including a first bosonic particle in a first input mode and a second bosonic particle in a second input mode, the interferometer interferes the plurality of bosonic particles with one vacuum mode, comprising an absence of a bosonic particle, in a third input mode, and the first outputs comprise one first output, the second outputs comprise one second output, the predetermined number of bosonic particles in the one first output is zero, and the predetermined number of bosonic particles in the one second output is one.

5. The device of claim 4, wherein:

the interferometer further comprises a first coupling and a second coupling, the first bosonic particle interferes with the second bosonic particle in the first coupling, and an intermediate output of the first coupling interferes with the one vacuum mode in the second coupling.

6. The device of claim 5, wherein:

the inputs consist of one first input inputting from a first path to the first coupling, one second input inputting from a second path to the first coupling, and one third input inputting to a third path;

the one or more third outputs comprise one third output;

the first coupling between the first path and the second path:

interferes the first bosonic particle transmitted in the first path with the second bosonic particle transmitted in the second path, so to form an interference, and outputs to the one first output and an intermediate output connected to a fourth path;

the second coupling between the third path and the fourth path:

interferes the intermediate output transmitted in the fourth path with the one vacuum mode transmitted in the third path, and outputs to the one second output and the one third output;

the one third output outputs the one purified bosonic particle in response to the one output vacuum mode (the absence of a bosonic particle) being detected at the one first output and the one bosonic particle being detected at the one second output; and the purified bosonic particle has a higher purity than the first bosonic particle and the second bosonic particle.

7. The device of any of claim 6, further comprising the one or more detectors detecting the one output vacuum mode at the first output in a first output mode and one bosonic particle at the one second output, and wherein the one third output transmits the one purified bosonic particle.

8. The device of any of claim 1, wherein each of the plurality of bosonic particles have input modes comprising at least one of:

one or more spatial modes, or one or more modes different from a spatial mode.

9. The device of claim 1, further comprising:

the interferometer comprising a plurality of first couplings and a plurality of second couplings, wherein the plurality of bosonic particles interfere in the first couplings and an intermediate output of the first couplings interferes in the second couplings with one or more vacuum modes.

10. The device of claim 9, wherein:

the interferometer includes a first plurality of paths and a second plurality of paths;

the inputs comprise first inputs and second inputs inputting from the first plurality of paths to the first couplings and third inputs and fourth inputs inputting from the second plurality of paths to the second couplings;

the outputs comprise the first outputs, the second outputs, and the one or more third outputs;

the first couplings:

couple the first plurality of paths so as to interfere the plurality of bosonic particles transmitted in the first plurality of paths; and have the first outputs and the first intermediate output;

the second couplings:

interfere one or more bosonic particles from the first intermediate output of the first couplings with a vacuum mode inputted to one of the fourth inputs to form a second intermediate output;

couple the second plurality of paths so as to interfere the vacuum modes, inputted to the second plurality of paths from the fourth inputs, with each other and with the first intermediate output;

output to the second outputs and the one or more third outputs;

the one or more third outputs output the one or more purified bosonic particles when:

the predetermined number of bosonic particles being detected at each of the first outputs is zero;

the predetermined number of bosonic particles being detected at each of the second outputs is one; and the one or more purified bosonic particles each have a higher purity than any of the plurality of bosonic particles inputted to the inputs.

11. The device of claim 9, wherein the interferometer further comprises a first set of n couplings and a second set of m couplings interfering the bosonic particles and the vacuum modes, wherein:

$n\geq 2$ is the number of the first set of n couplings, $m\geq 2$ is the number of the second set of m couplings, and $N>2$ is the number of the bosonic particles inputted to the first set of n couplings.

12. The device of claim 11, wherein $m=n=N-1$.

13. The device of claim 11, wherein:

each of the first set of n couplings have the inputs comprising a first input and a second input and first coupling outputs comprising one of the first outputs and a first intermediate output, the first intermediate output of the $j^{th}$ coupling in the first set of n couplings is coupled to the first input of the $j+1^{th}$ coupling for $1\leq j<n$;

each of the second set of m couplings have the inputs comprising a third input and a fourth input and two second coupling outputs selected from a second intermediate output, one or more of the second outputs, and one of the third outputs, the $k^{th}$ coupling in the second set of m couplings has the second coupling outputs comprising one of the second outputs and the second intermediate output, for $1<k<m$, the $k=m^{th}$ coupling in the second set of m couplings has the second coupling outputs comprising two of the second outputs, the $k=1^{th}$ coupling in the second set of m couplings has the second coupling outputs comprising the third output and the second intermediate output, the second intermediate output of the $k^{th}$ coupling in the second set of m couplings is coupled to the third input of the $k+1^{th}$ coupling in the second set of couplings for $1\leq k<m$, the third input of the first ($k=1^{th}$) coupling in the second set of m couplings is coupled to the first intermediate output of the last ($n^{th}$) coupling in the first set of n couplings, each of the plurality of vacuum modes are coupled to a different one of the fourth inputs to the second set of m couplings, and the third output of the first ($k=1^{th}$) coupling in the second set of m couplings outputs one of the purified bosonic particles in response to:

the plurality N of bosonic particles being inputted to the first set of n couplings so that one of the plurality of bosonic particles is inputted to each second input of the first set of n couplings and the first input of the $(j=1)^{th}$ coupling, the predetermined number of bosonic particles being detected at each of the first outputs is zero, and the predetermined number of bosonic particles being detected at each of the second outputs of the $k>1$ couplings in the second set of m couplings is one.

14. The device of any of claim 1, comprising a shutter, gate, or processor selecting and/or transmitting the one or more purified bosonic particles for use in an application.

15. The device of claim 1, wherein the bosonic particles comprise photons and the interferometer interferes an electromagnetic field of the photons or vacuum mode(s) received in the inputs.

16. The device claim 15, wherein the detectors comprise one or more photodetectors detecting the one or more bosonic particles comprising the photons and/or certifying the absence of bosonic particles comprising photons.

17. The device of claim 15, wherein the couplings each comprise a beamsplitter, a coupler, or a linear optical device capable of interfering photons or electromagnetic fields.

18. The device of claim 1, wherein a purity of the purified bosonic particles is increased by at least 1% as compared to an input purity of one or more of the plurality of bosonic particles inputted at the inputs.

19. The device of claim 1, wherein a purity of the purified bosonic particles is such that purified bosonic particles outputted at the one or more third outputs are more indistinguishable from each other and the plurality of bosonic particles are more distinguishable than the purified bosonic particles.

20. The device of claim 1, wherein a purity of the purified bosonic particles is characterized by observation of a dip evidencing a Hong-Ou-Mandel effect in a two-photon interference measurement between the purified bosonic particles outputted from the device, wherein the dip is larger and has higher contrast as compared to a dip, if any, measured for the two-photon interference between any two of the plurality of bosonic particles.

21. The device of claim 1, wherein a purity of the purified bosonic particles is sufficient for the purified bosonic particles to be used in quantum computing, quantum memory, quantum communication, quantum cryptography, or quantum sensing.

22. A photonic integrated circuit including the device of claim 1, wherein further comprising paths between the inputs and the outputs, and the paths comprise waveguides in the photonic integrated circuit.

* * * * *